US011294911B2

(12) United States Patent
Hornkvist et al.

(10) Patent No.: US 11,294,911 B2
(45) Date of Patent: Apr. 5, 2022

(54) METHODS AND SYSTEMS FOR CLIENT SIDE SEARCH RANKING IMPROVEMENTS

(71) Applicant: Apple Inc., Cupertino, CA (US)

(72) Inventors: John M. Hornkvist, Los Gatos, CA (US); Anubhav Malhotra, San Francisco, CA (US); Rene Chan, Santa Clara, CA (US); Stanley Hung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 532 days.

(21) Appl. No.: 15/860,597

(22) Filed: Jan. 2, 2018

(65) Prior Publication Data

US 2019/0102397 A1 Apr. 4, 2019

Related U.S. Application Data

(60) Provisional application No. 62/566,084, filed on Sep. 29, 2017.

(51) Int. Cl.
*G06F 16/2457* (2019.01)
*G06F 16/9535* (2019.01)
*G06F 16/2458* (2019.01)

(52) U.S. Cl.
CPC .... *G06F 16/24578* (2019.01); *G06F 16/2471* (2019.01); *G06F 16/9535* (2019.01)

(58) Field of Classification Search
CPC ........... G06F 16/24578; G06F 16/2471; G06F 16/9535
USPC ....................................................... 707/723
See application file for complete search history.

(56) References Cited

U.S. PATENT DOCUMENTS

| 8,458,165 | B2* | 6/2013 | Liao | G06F 16/284 |
| | | | | 707/713 |
| 8,671,093 | B2* | 3/2014 | Chapelle | G06F 16/951 |
| | | | | 707/723 |
| 10,373,075 | B2* | 8/2019 | Wu | G06Q 30/0201 |
| 2008/0031258 | A1* | 2/2008 | Acharya | H04L 69/22 |
| | | | | 370/395.42 |
| 2009/0070312 | A1* | 3/2009 | Patterson | G06F 16/313 |
| 2015/0347594 | A1* | 12/2015 | Hornkvist | G06F 16/9537 |
| | | | | 707/711 |
| 2016/0012620 | A1* | 1/2016 | Kanada | G06T 11/206 |
| | | | | 345/440 |

(Continued)

*Primary Examiner* — Ashish Thomas
*Assistant Examiner* — Abdullah A Daud
(74) *Attorney, Agent, or Firm* — Aikin & Gallant, LLP

(57) ABSTRACT

Methods and systems for client side search ranking improvements are disclosed. In one example, a search query is received from a user on a client device. The local search results are filtered based on the received search query and one or more local ranking rules. Features for each filtered local search result are computed. The computed features of each filtered local search result are input to one or more machine learning (ML) models. Each ML model can generate a score for each filtered local search result. The filtered local search results are ranked based on the generated score within a category. In one example, local search results and remote server search results are obtained. The local search results and remote server search results are ranked using at least one machine learning (ML) ranking model. The ranked local search results and remote server search results are displayed on the client device by category.

28 Claims, 15 Drawing Sheets

(56) References Cited

U.S. PATENT DOCUMENTS

| | | | |
|---|---|---|---|
| 2016/0041982 A1* | 2/2016 | He | G06F 16/9535 |
| | | | 707/728 |
| 2017/0300530 A1* | 10/2017 | Tang | G06F 16/24578 |
| 2017/0344554 A1* | 11/2017 | Ha | G06F 16/248 |
| 2018/0067945 A1* | 3/2018 | Jain | G06Q 30/0241 |
| 2018/0239830 A1* | 8/2018 | Dialani | G06Q 10/1053 |
| 2018/0285176 A1* | 10/2018 | Mozhaev | G06F 16/24578 |

* cited by examiner

| CONTACTS 502 | FACETIME CALLS 504 | MOST RECENT FACETIME CALL FEATURE 506 |
|---|---|---|
| CONTACT A | MAY 15, 2017 | 1 |
| CONTACT B | MAY 12, 2017 | 2 |
| CONTACT C | JANUARY 5, 2016 | 3 |

PRIVATE DATA 505 (FACETIME CALLS column)
COMPUTED FEATURES 508 (MOST RECENT FACETIME CALL FEATURE column)

FIG. 5A

| DOCUMENTS 512 | LAST USED DATE 514 | LAST USED TIMELINE 516 | | | |
|---|---|---|---|---|---|
| | | <24HRS | <1WK | <1MO | <1YR |
| DOC 1 | MAY 16, 2017 | 0 | 0 | 0 | 1 |
| DOC 2 | MAY 8, 2017 | 0 | 0 | 0 | 1 |
| DOC 3 | JANUARY 1, 2016 | 0 | 0 | 0 | 0 |

PRIVATE DATA 515 (LAST USED DATE column)
COMPUTED FEATURES 518 (LAST USED TIMELINE columns)

FIG. 5B

METHODS AND SYSTEMS FOR CLIENT SIDE SEARCH RANKING IMPROVEMENTS

PRIORITY

This application claims priority and the benefit of U.S. Provisional Patent Application No. 62/566,084, entitled "METHODS AND SYSTEMS FOR CLIENT SIDE SEARCH RANKING IMPROVEMENTS, filed on Sep. 29, 2017, which is hereby incorporated by reference and commonly assigned.

FIELD

The present invention relates generally to data processing and for improving relevance of search results and, more particularly, to methods and systems for client side search ranking improvements.

BACKGROUND

Computing devices, such as, e.g., mobile phones, laptops, accessories etc., can store and access vast amounts of data and content across numerous sources locally and remotely. Users can search for content and data on such computing devices by inputting a query into a search engine. The search engine can rank relevant search results for the query and provide the ranked search results to the user. Determining relevant search result and ranking them for the user can involve multiple fields, features and parameters, which can make the ranking process complex coupled with the need for a quick response time for the user. In addition, privacy issues regarding information about a user can also be a concern in determining relevant search results for the user.

SUMMARY

Methods and systems for client side search ranking improvements are disclosed. In the following examples and embodiments, improvements and refinements for client based predictive models in ranking search results are provided.

According to one example, a computer-implemented method is disclosed. A search query is received from a user on a client device. The local search results are filtered based on the received search query and one or more ranking rules. Features for each filtered local search result are computed. The computed features of each filtered local search result are input to one or more machine learning (ML) models. Each ML model can generate a score for each filtered local search result. The filtered local search results are ranked based on the generated score within a category. The categories of the filtered local search results can be ranked based on highest scored results in each category. In one example, some configurable decision rule based policies can override the order both within each and/or across categories.

In one example, filtering the local search results includes applying the one or more ranking rules to each local search result to generate a bit vector including one or more count values. The bit vector can include individual bits representing applicable ranking rules and a fixed combination of bits representing the one or more count values. In one example, the count value can be a number of ranking rules applicable to the local search result. The count values of each bit vector can be compared with each other to rank the local search results based on the comparison. For example, local search results with bit vectors having count values with higher numbers can be ranked higher than other local search results with bit vectors having count values with lower numbers. In one example, the filtered local search results include a set of top ranked local search results within a category. And, in one example, computing features for the filtered local search results includes computing ranking values or Boolean values for the computed features related to the filtered local search results.

In one example, the computed features of the filtered local search results are transformed for processing by the one or more ML models. The transformed computed features of the filtered local search results are input to the one or more machine learning (ML) models. Each ML model can generate a score for each filtered local search result. Transforming the computed features can use feature dependent transformation operations. In one example, a first set of transformed computed features are input to a first ML model and a second set of computed features are input to a second ML model. The first ML model generates a first score and the second ML model generates a second score. The first score and the second score can be combined to rank the filtered local search results. The first set and second set of computed features can include different computed features.

In one example, local search results and remote server search results are obtained. The local search results and remote server search results are ranked using at least one machine learning (ML) ranking model. The ranked local search results and remote server search results are displayed on the client device by category. In one example, a first processing path or a second processing path is selected to rank the obtained local search results and remote server search results.

In one example, if the first processing path is selected, additional features are computed for the remote server search results. The additional computed features for the remote server search results and computed features of top ranked local search results are input to a first machine learning (ML) ranking model. A score is generated for each of the local search results and remote server search results by the first ML ranking model. The local search results and remote server search results are ranked by category based on the generated score. The ranked local search results and remote server search results are displayed by category.

In one example, if the second processing path is selected, a subset of features is computed for top ranked local search results per local category. Features of remote server search results are obtained. The computed subset of features for top ranked local search results and features of remote server search results are input to a second machine learning (ML) ranking model. A score is generated for each of the local search results and remote server search results by the second ML ranking model. The local search results and remote server search results are ranked by category based on the generated score. The ranked local search results and remote server search results are displayed by category. Ranking of the local search results and remote server search results can include ranking the categories for the local search results and remote server search results. In other examples, processing can occur down both paths and a third and fourth ML ranking models can generate scores which are combined to rank local search results and remote server search results and ranked results can be displayed by category.

Other methods and systems for client side search ranking improvements are described.

BRIEF DESCRIPTION OF THE DRAWINGS

The present invention is illustrated by way of example, and not limitation, in the figures of the accompanying drawings, in which like references indicate similar elements.

FIGS. 5A-5B are examples of computing feature for local search results according to local feature categories.

DETAILED DESCRIPTION

Figure 1A:
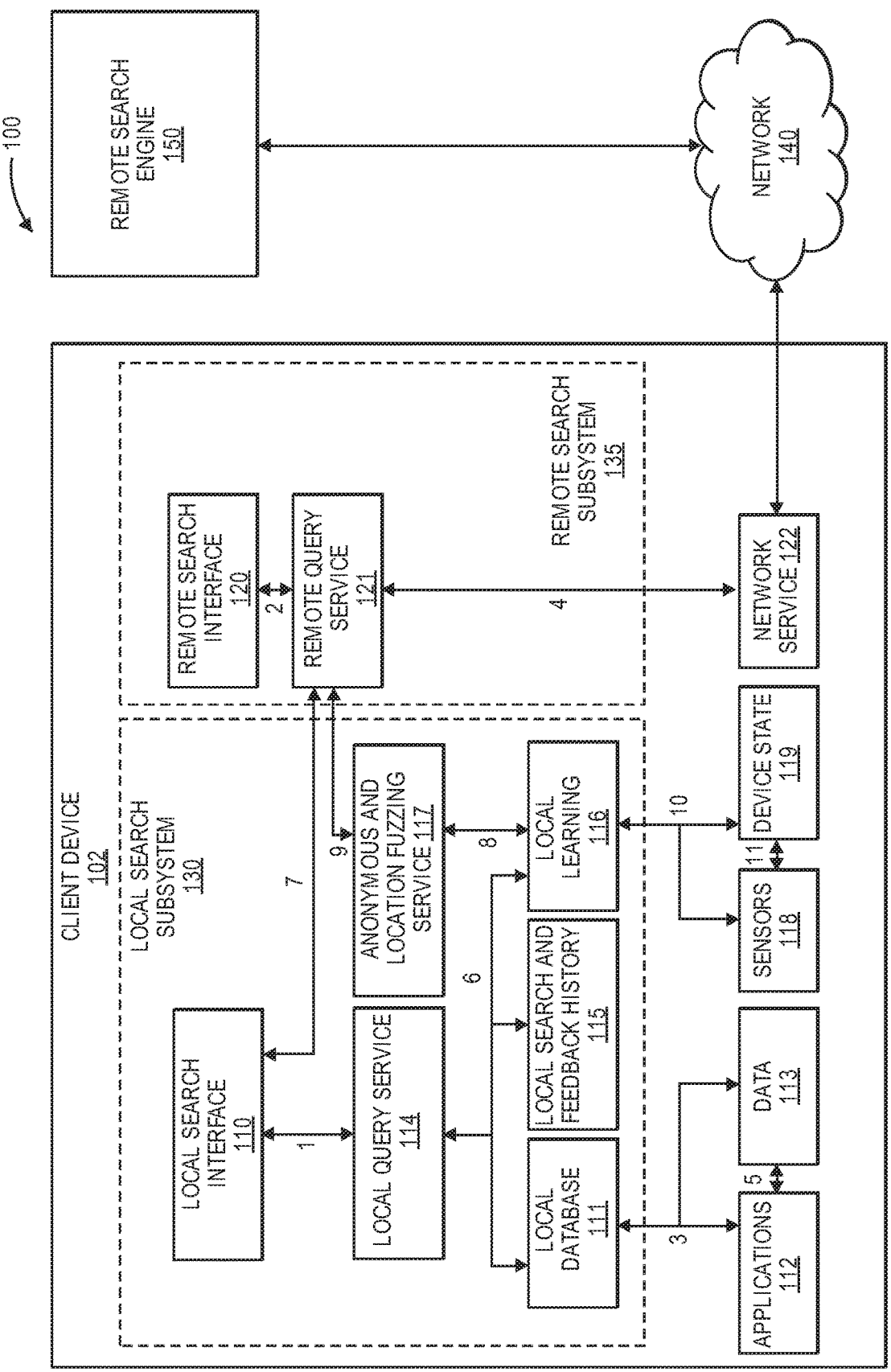
FIG. 1A is a block diagram of an exemplary system having a client device with a local search subsystem and remote search subsystem for implementing improved client side search ranking techniques as disclosed herein.

Methods and systems for client side search ranking improvements are disclosed. In the following examples and embodiments, improvements and refinements for client based predictive models in ranking search results are provided.

For one example, a computer-implemented method is disclosed. A search query is received from a user on a client device. The local search results are filtered based on the received search query and one or more local ranking rules. Features for each filtered local search result are computed. The computed features of each filtered local search result are input to one or more machine learning (ML) models. Each ML model can generate a score for each filtered local search result of each category. The filtered local search results are ranked based on the generated score within a category. The categories of the filtered local search results can be ranked based on highest scored results in each category. In one example, some configurable decision rule based policies can override the order both within each and/or across categories.

The computed features of the filtered local search results can be transformed for processing by the one or more ML models. The transformed computed features of the filtered local search results are input to the one or more machine learning (ML) models. Each ML model can generate a score for each filtered local search result. Transforming the computed features can use feature dependent transformation operations. In one example, a first set of transformed computed features are input to a first ML model and a second set of computed features are input to a second ML model. The first ML model generates a first score and the second ML model generates a second score. The first score and the second score can be combined to rank the filtered local search results. The first set and second set of computed features can include different computed features.

In one example, local search results and remote server search results are obtained. The local search results and remote server search results are ranked using at least one machine learning (ML) ranking model. The ranked local search results and remote server search results are displayed on the client device by category.

Reference in the specification and detailed description to an "example" or "embodiment" indicates that a particular aspect, feature, structure, or characteristic described in conjunction with the example or embodiment can be included in at least one example and embodiment. The appearances of the phrase "in one example" or "in one embodiment" in various places in the specification do not necessarily all refer to the same embodiments. The processes depicted in the figures that follow can be performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Processes and operations are depicted and disclosed in the Figures that follow and described in the Detailed Description. Such processes and operations can be performed by processing logic that comprises hardware (e.g., circuitry, dedicated logic, etc.), software (such as is run on a general-purpose computer system or a dedicated machine), or a combination of both. Although the processes and operations are described below in terms of some sequential operations, it should be appreciated that some of the operations described may be performed in different order. Moreover, some processes and operations may be performed in parallel rather than sequentially.

Various examples, embodiments and aspects will be described with reference to details discussed below, and the accompanying drawings will illustrate the various examples and embodiments. The following description and drawings are illustrative and are not to be construed as limiting. Numerous specific details are described to provide a thorough understanding of various embodiments. In certain instances, well-known or conventional details are not described in order to provide a concise discussion of the examples and embodiments.

Terminology

In the following detailed description, certain terms are used to describe the disclosed examples and embodiments. These terms, however, are not intended to limit the scope of the invention, but to aid in understanding the present invention.

"Server," "client," and "device" are intended to refer generally to data processing systems rather than specifically to a particular form factor for the server, client, and/or device.

"Local results" (or local query results) can refer to results returned from a local database on a client device in response to a query. "Local database" can refer to a database of information that is generally considered private to the user of a client device, which can store public information. A local database may reside physically on a client device or accessible remotely by the client device, which is used by, owned by, registered to, or authorized to use for a particular user. For example, the local database can also reside on a network or cloud storage that is accessible to the user of the client device via an account that is owned by, or registered to, a user of the client device.

"Private information" of a user is information that reasonable members of the public would deem personal and would not want to be shared with, for example, a remote search engine. "Anonymized version" of some private information may be shared with a remote search engine. For example, the exact address of the home of a user or a file name used by the user may be considered private and would not be sent to a remote search engine. Nevertheless, the fact that a user is not currently issuing a query from his home may be sufficiently anonymous to be sent to a search engine. In other words, anonymous information should not identify a particular user.

"Search engine results" can refer to results returned from a remote search engine that is generally accessible to the public, with or without a logon or other authentication to use the search engine, by way, e.g., the Internet. Examples of remote search engines include Ask®, Yahoo®, Google® Search, AolSearch®, Bing®, or a plurality of such search engines. Search engine results can include results returned to a search engine by search domains, such as Wikipedia, Yelp®, a maps domain, a media domain, Twitter®, etc. Search engine results can also refer to local search engines of a client device such as, for example, Spotlight® by Apple. Although a client device may send some information to a search engine, the information is typically sent in an anonymized form such that a particular person is not identified by information sent to the search engine. Further, private information is generally not sent to the search engine unless the information is sufficiently anonymized to preserve the privacy of the user of the client device.

"Results" (or search results) can refers to either local search results or remote search results, or both, and should be considered in the context in which it is used, and not in isolation.

"Crowd-source data" can refer to data generated as a consequence of a plurality of users issuing queries to a remote search engine and the feedback received from clients indicating a user's interaction with the search engine results to a user's query. Crowd source data includes queries issued to a remote search engine, and includes interaction data (feedback data) with search engine results, including engagement with a particular result, dwell time, click-through, rendering of the page, and abandonment of the result.

Figure 4A:
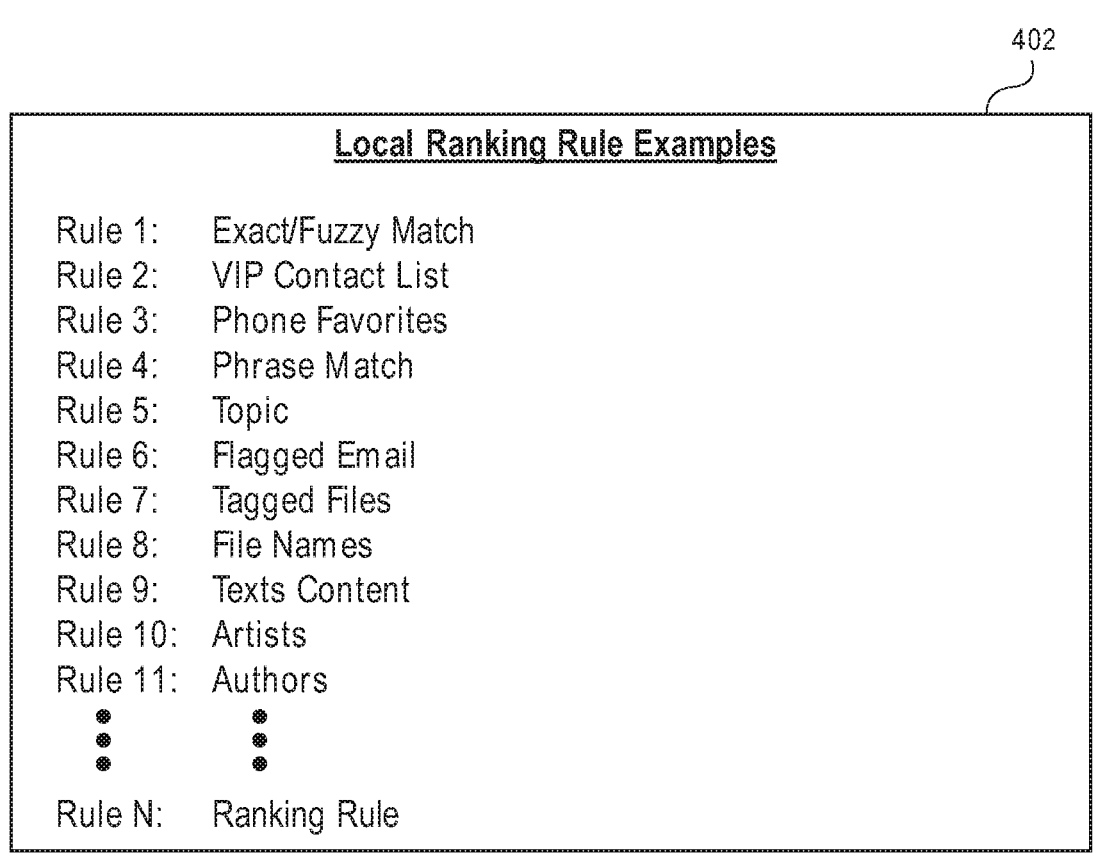
FIG. 4A are local ranking rule examples.

"Predictor" can refer to a machine learning (ML) model, which can use data mining and probability techniques to forecast (or predict) outcomes—i.e., relevant search results. In one example, a predictor can correlate a query and one or more features, with the user feedback regarding interaction, with results returned from the query. In one example, for local search results, there can be a feature for each ranking rule of local results such as shown in FIG. 4A, e.g., local ranking rule examples such as VIP list, phone favorites, phrase match, etc. In other examples, that can be a predictor for categories such as local email results, local text results, local contact results, remote results from, e.g., Yelp® or Wikipedia®, remote results for media, remote results for maps, and etc.

"Machine learning" also referred to as "ML" can include supervised learning, unsupervised learning, and reinforcement learning. A predictor, or ML model, can be represented in a data structure having values. The data structure can be passed from a client device to a search engine, or received by a client device from a search engine. An example follows:

```
{
    "model_algorithm" : "naive_bayes",
    "model_type" : "main_tophit_model",
```

-continued

```
"model_features" : [
    {
        "feature_name" : "query_most_recently_selected",
        "feature_type" : "boolean",
    },
    {
        "feature_name" : "query_previously_selected",
        "feature_type" : "boolean",
    },
    {
        "feature_name" : "previously_selected",
        "feature_type" : "boolean",
    },
    {
        "feature_name" : "name_matches",
        "feature_type" : "boolean"
    },
    {
        "feature_name" : "match_quality",
        "feature_type" : "real"
    },
    {
        "feature_name" : "domain",
        "feature_type" : "keypath"
    },
    {
        "feature_type" : "boolean",
        "feature_name" : "domain_tophit_candidate",
        "model_selector" : "domain"
    }
```

The above model algorithms, types, and features are exemplary any type of probabilistic or statistical analysis or ML algorithms can be used such as Bayes classification, Naïve Bayes classification, Gradient Boosting Decision Trees (GBDT) models, Deep Neural Networks (DNN), linear regression models or logistic regression models as examples of providing predictive ML algorithms for a predictor. For example, "feature-names" for above example data structure can refer to any of the features described in the following examples and embodiments.

"User feedback" can refer to how a user interacts with one or more results from query results. User feedback includes whether a result was rendered to a user, whether the user engaged with the result, such as by clicking on the result, whether the user "hovered" over the result (also referred to as "dwell time") such as by holding a mouse icon over a result, as if considering whether to engage with the result, whether the user abandoned the result, or whether the user did not interact with the result. Each of these user feedback elements can be measured in time from a reference point, such as the time at which the query results were presented to the user. By measuring user feedback in time, it can further be determined the order in which each of the query results was interacted with, if at all. In a client device, user feedback will generally be a single user of the client device. On a search engine, user feedback will generally be crowd-source data.

"Feature" (also known as a sensor, in machine learning ML) of a predictor can refer to an input to the predictor that will be used to train the predictor to predict the results that a user will likely interact with. In one example, features can be a physical sensor, such as a light sensor, motion detector, vibration detector, horizontal/vertical switch or orientation sensor, sound detector (e.g. microphone), signal strength of network connection, such as WiFi or cellular network, or a location sensor, such as an RF receiver for triangulation of cell towers or GPS receiver that provides GPS coordinates. A feature can be obtained from a combination of physical sensors, such as a GPS receiver and an accelerometer and an orientation sensor can in combination detect whether the user is walking, running, driving, or stationary. In other examples, features can be obtained from information sources available to a client device, such as the current date, time, time zone, weather, or temperature.

Features can also be a state, or combination of states of a client device, such as which applications are open, how long the applications have been open, whether a user has issued a query that relates to an application that is open, such as a user query regarding music when iTunes® is open, calendar events in the user's calendar, or whether a user is on a call, writing a text, or answering an email. Features can also be obtained from tags in results. For example, Yelp® may tag restaurant results with a price rating with a certain number of "$" signs or tag results with a service quality rating measured in a certain number of stars. The "$" tag may be in the form of an integer value, rather than a text tag. For example, Yelp® may return results tagged with a field: integer: yelp_dollars=3. Netflix® may tag results with an MPAA® rating, such as G, PG-13 or R, a price, a duration of a movie, or a genre of a movie. These tags can be used as features for a predictor. For example, Bob frequently selects PG-13 action movies priced under $9.99 that are less than two hours long, on weekend evenings. A feature may also be in the form of a key path. For example, a Netflix® result may have a tag: key path: genre="movie.horror.japanese," wherein each field of the key path can be a sub-genre of the result. A feature can further be identified in a boolean field, such as "boolean: Top-Hit=TRUE." A feature can alternatively be expressed as a real value, e.g. "real: Average_Stars=3.5". Features can also be computed to indicate how a search result matched with a user query, e.g., which facetime call was the most recent by giving values "1", "2" and "3" where 1 indicates the most recent facetime call and 3 the least recent facetime call.

In some examples, a predictor can treat each of these possible features as an individual feature (input) to the predictor. In some examples, a client device may maintain an aggregate, current state of a combination of features that a plurality of predictors can use as a single feature. For example, a user's location, the current day of the week, the current time of day, and a list of applications open on a device are features that may frequently appear together in predictors. A client device can maintain these features in a current state, as an aggregate feature (input) to any predictor that uses these features. A feature can additionally be a distinction learned from analyzing results data. For example, whether "football" refers to American football or soccer is a feature than a predictor can train upon to determine whether this particular user interacts with soccer results of American football results. A remote search engine can request that one or more features be calculated by the client device at the beginning of a search session.

Features can also be learned either on local results or on remote search results. When a predictor is generated to learn on a new feature, the feature can be tagged with "local" or "remote" based upon whether the feature was learned on local results or remote search results. "Learning a new feature" refers to generating a new predictor, or extending or modifying an existing predictor, to train on that new feature. For example, an existing predictor may have trained on restaurant selections at lunch time during week days near the current location of a client device. A new feature may be that results returned from Yelp® now include a tag indicating a price range for menu items in restaurant results. The existing predictor can be extended to train on the price range tag as a new feature in the predictor having the features lunch time, week day, and near the user of the client device.

"Feature metadata" can refer to data structures passed from a search engine to client device, or from a client device a search engine. Features can utilize this format with values in the fields. Exemplary features set be represented as follows where any feature name and fields can be used:

```
feature_metadata : [
    {
        "feature_name" : "popularity",
        "feature_type" : "real",
        "normalized" : 1,
        "feature_value" : 0.9
    },
    {
        "feature_name" : "high_traffic",
        "feature_type" : "boolean",
        "feature_value" : 1
    },
    {
        "feature_name" : "site_domain",
        "feature_type" : "string",
        "feature_value" : "apple.com"
    },
    {
        "feature_name" : "site_type",
        "feature_type" : "keypath",
        "feature_value" :"company.consumer_electronics.frontpage"
    },
    {
        "feature_name" : "site_language",
        "feature_type" : "keypath",
        "feature_value" : "en.us"
    },
]
```

"Computed Features" in the following examples and embodiments can be grouped into "feature groups." Examples of feature groups can include any number of groups in which Groups 1 through 7 are detailed below as exemplary.

Group 1 can include result only features. These features can be computed a single result at a time without using a query or any other results in the result set. For example, such features can be computed using only certain pre-existing attributes (or some statistical measure derived from those attributes) of the result at the time right before a user enters a query. Examples can include: (a) for application results: computing number of times an application has been launched by the user (could be launched with and/or without, e.g., a search application such as Spotlight) in the last week; (b) for music results, computing number of times the user has played a certain song.

Group 2 can include result query features. These features can be computed a single result at a time using the query. In one example, these features can be computed without using any other results in the result set. For example, these features can be computed using certain pre-existing attributes (or some statistical measure derived from those attributes) of the result, and the user query itself. Examples can include: (a) for an application result: determining the first matching position (in terms of character position, and the first character position starts at 0 within the display name of the app ("Facebook", for example) that matches the full word of any query terms ("any" because the user could have entered more than 1 query terms); (b) for mail results: computing the minimum matching span within the mail snippet that contains all the query terms in the order entered by the user; (c) for contact results: computing the number of times any query terms prefix matches ("prefix match" means a query terms matches portion of the display name, starting from the beginning. For example, the query term "ja" prefix matches the display name "jack") the display name of a contact.

Group 3 can include result-set features. These features can be computed a single result at a time using all other results in the result set. For example, these features can be using certain pre-existing attributes (or some statistical measure derived from those attributes) of the result including a whole result set. An example can be computing the number of application results in the result set that have been launched more than once in the past week, and this can be a feature computed for all the results, including non-application results.

Group 4 can include result query result-set features. These features can be computed a single result at a time using the query and all other results in the result set. For example, these features can be computed using certain pre-existing attributes (or some statistical measure derived from those attributes) of the result including the user query itself and the whole result set. An example can be computing the minimum value of all the mail results (those in the result set) minimum match span (of snippet that contains all the query terms in order).

Group 5 can include result user features. These features can be computed a single result at a time using an identity or attribute (or some statistical measure derived from those attributes) of the user and the result. An example can be for a mail result determining whether the mail is sent by the user.

Group 6 can include result user query result set features. These features can be computed a single result at a time using the query and whole result set. For example, these features can be computed using attribute (or some statistical measure derived from those attributes) of the result, identify or attribute (or some statistical measure derived from those attributes) of the user, and attribute (or some statistical measure derived from those attributes) of the result set. An example can be for any result computing the number of mail results sent by the user in the result set.

Group 7 can include query only features. These features can be computed a single result at a time using some attributes (or some statistical measure derived from those attributes) of the query. An example can be after the local search engine returns the result set computing what percentage of responses is user continue to search in an app store instead of engaging with any of the results returned.

"Search session" can refer to a time-limited session of interaction between a client device and a search engine. For example, a search engine can collect significant amounts of information about a user of a client device through the queries and selections (user interaction data) that a user makes during a search session. Even though the search engine should not know, with any specificity, the exact identity of a particular user, an unlimited accumulation of user interaction data may identify a user with a high degree of specificity. To preserve privacy when interacting with a search engine, a search engine can limit collection of data to a time-limed session. The session has a unique session identifier (session ID). The timer may be set for, e.g., 15 minutes. At expiration of the session timer, the user is issued a new session ID. Although the search engine may retain and analyze the 15-minute block of information, the search engine should not associate the new session ID with the old session ID, else there would still be an accumulation of user interaction data and the session limits would have no privacy protecting effect.

"Application programming interfaces (APIs)" can refer to an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. Examples disclosed herein can include an environment with a calling software component interacting with a called software component through an API. A method for operating through an API in this environment includes transferring one or more function calls, messages, other types of invocations or parameters via the API.

Exemplary Systems for Improved Client Side Search Ranking

FIG. 1A is a block diagram of exemplary system 100 having a client device 102 with a local search subsystem 130 and remote search subsystem 135 for implementing improved client side search ranking techniques in the disclosed examples and embodiments. Local search subsystem 130 includes local search interface 110, local query service 114, local search and feedback history 115, and local learning system 116, which can be used to improve ranking of local search results for a user inputting a search query via local search interface 110 of client device 102. In one example, local search interface can be a graphical interface provided to a user of client device 102 such as Apple Spotlight® or any type of navigational browser or interface for client device 102.

In one example, a user of client device 102 can use a remote search interface 120 and remote query service 121 of remote search subsystem 135 to obtain remote search results, e.g., by remote search engine 150 via network 140. In one example, client device 102 can return search results for queries entered via local search interface 110 and remote search interface 120 without exposing private information of a user. In one example, private information is anonymized by anonymization and location fuzzing service 117 before sending information to remote search engine 150 via remote query service 121. In one example, local learning system 116 can be pre-set with machine learning (ML) models including ML ranking models (which can be used to rank search results of different types) or reset so that ML models are flushed and relearning can be implemented by local learning system 116. In other examples, local learning system 116 can modify existing ML models.

Local search subsystem 130 for client device 102 also includes local database 111, which can store and access data 113 including data and metadata for applications 112 for computing device 102. In one example, local database 111 stores and can access local information about data sources by category or ranking rule examples as shown in FIG. 4A. In other examples, local database 111 stores and can access data sources such as a contacts database, titles of documents or words in documents, titles of applications and data and metadata associated with applications, such as emails, instant messages, spreadsheets, presentations, databases, music files, pictures, movies, and other data that can be stored locally on client device 102.

In other examples, local database 111 can store and access information about data sources stored in a user's Cloud storage. Applications 112 can include a calculator program, a dictionary, a messaging program, an email application, a calendar, a phone, a camera, a word processor, a spreadsheet application, a presentation application, a contacts management application, a map application, a music, video, or media player, local and remote search applications, and other software applications other types of applications for computing device 102. In one example, a user can generate a query using local search interface 110 and query results returned from local database 111, via communication interface path 1, and displayed in local search interface 110. In one example, the results are ranked and displayed to a user of computing device 102 using techniques in the disclosed examples and embodiments.

In one example, local search interface 110 can also pass queries to remote query service 121, via communication interface path 7, so that local search interface 110 receives search results from both local database 111 and from remote search engine 150, which can also be ranked according to techniques in the disclosed examples and embodiments. Local query service 114 can remove redundant white space, remove high frequency-low relevance query terms, such as "the" and "a", and package the query into a form that is usable by the local database 111. Remote query service 121 can perform analogous functionality for the remote search engine 150. In an embodiment, local search interface 110 can pass the query to the remote query service 121, via communication interface path 7, to obtain query results from remote search engine 150. In one example, remote query service 121 can receive a query feature learned by local learning system 116 via communication interface path 8. Such a query feature can be used to extend the query and/or bias a query feature to the remote search engine 150. In one example, remote query service 121 can pass a query feature, returned from the remote search engine 150, to local learning system 116 for training on that feature via communication interface path 8.

Local search and feedback history 115 can store the history of all search queries issued using the local query interface 110, including queries that are sent to the remote query service 121 via communication interface path 7. Local search and feedback history 115 can also store user feedback associated with both local and remote results returned from a query. Feedback can include an indication of whether a user engaged with a result, e.g. by clicking-through on the result, how much time the user spent viewing the result, whether the result was the first result that the user interacted with, or other ordinal value, whether result was the only result that a user interacted with, and whether the user did not interact with a result, i.e. abandoned the result. User feedback can be encoded and stored in association with the query that generated the results for which the feedback was obtained. In one example, local search and feedback history 115 can store a reference to one or more of the results returned by the query. Information stored in local search and feedback history 115 can be deemed private user information and would not be available to, or accessible by, the remote search subsystem 135. In one example, local search and feedback history 115 can be flushed. In another example, local search and feedback history 115 can be aged-out after a certain time period. In one example, age-out timing can be analyzed so that stable long-term trends are kept longer than search and feedback history showing no stable trend.

Local learning system 116 can analyze local search and feedback history 115 to identify features upon which the local learning system 116 can train. Once a feature is identified, local learning system 116 can generate a local predictor to train upon the feature. In one example, computing device 102 may be have an initial set of one or more local predictors installed on computing device 102 before a user begins using the device for the first time. In another example, local learning system 116 can modify a predictor by adding a feature to the predictor, deleting a feature from the predictor using feature reduction, or replace a predictor with a predictor received from remote search engine 150.

In one example, a predictor is an instance of a software component that operates on one or more pieces of data. In one embodiment, local predictors can train using statistical or probabilistic classification methods and models such as Bayes classification, Naïve Bayes classification, Gradient Boosting Decision Trees (GBDT) models, Deep Neural Networks (DNN), linear regression models or logistic regression models as examples. In one example, a predictor can be specific to a category such as, e.g., contacts, emails, calculator results, media results, maps results, Yelp® results, Wiki results, site search results, etc.

Anonymization and location fuzzing service 117 ("anonymization service") can ensure that private information of the user that is stored in local database 111, local search and feedback history 115 and local learning 116 is kept private and is not sent to a remote search engine 150 without first anonymizing the data to be sent to the remote search engine 150. For example, anonymization and location fuzzing service 117 may substitute "at home" as a status of the user, instead of sending the user's home address, nearby cell tower identifiers, cell network IP address, WiFi IP address, or other information that could identify the user's location with a high degree of specificity. Similarly, anonymization service 117 may substitute "romantic comedy" as a genre that the user prefers in place of exact information identifies a particular movie that the user has previously selected for viewing, such as "Something About Mary."

Anonymization service 117 can further include a location "fuzzing" service. The location fuzzing service ensures that the exact location of a user is kept private. The location fuzzing service can take into account the population density of the current location of the user and obfuscate (or "fuzz") the user's location sufficiently to ensure privacy. For example, a user may currently be located in a highly dense city, looking for Italian restaurants having a price rating on Yelp® of "$$$$" and a dinner service rating of 4.5 stars on Columbus Ave. in San Francisco Calif. Since the current location of the user is fairly dense, the anonymizer service 117 may substitute a "fuzzed" location of the user, accurate within few blocks, in place of the user's exact GPS coordinates (accurate within a few feet) to remote search engine 150 to obtain search results that are within walking distance of the user. In contrast, if the user is currently located on a remote farm in Ireland, and may be the only user within the area, anonymizer service 117 may substitute a "fuzzed" location for the exact location of the user that is accurate within a few square miles.

Computing device 102 can also include remote search subsystem 135 having remote search interface 120 and remote query service 121. Remote search interface 120 can include a web browser such as Apple® Safari®, Mozilla®, or Firefox®. Query service 121 can perform intermediary processing on a query prior to passing the query to network service 122 and on to remote search engine 150 via network 140. Network service 122 can receive results back from remote search engine 150 for display on remote query interface 120 or on local search interface 110. Remote query service 121 can be communicatively coupled to network service 122 via communication interface path 4. Network 140 can include the Internet, an 802.11 wired or wireless network, a cellular network, a local area network, or any combination of these. Communication paths 1-8 can be implemented using inter-process communication, shared memory, sockets, or an Application Programming Interface (API).

Figure 1B:
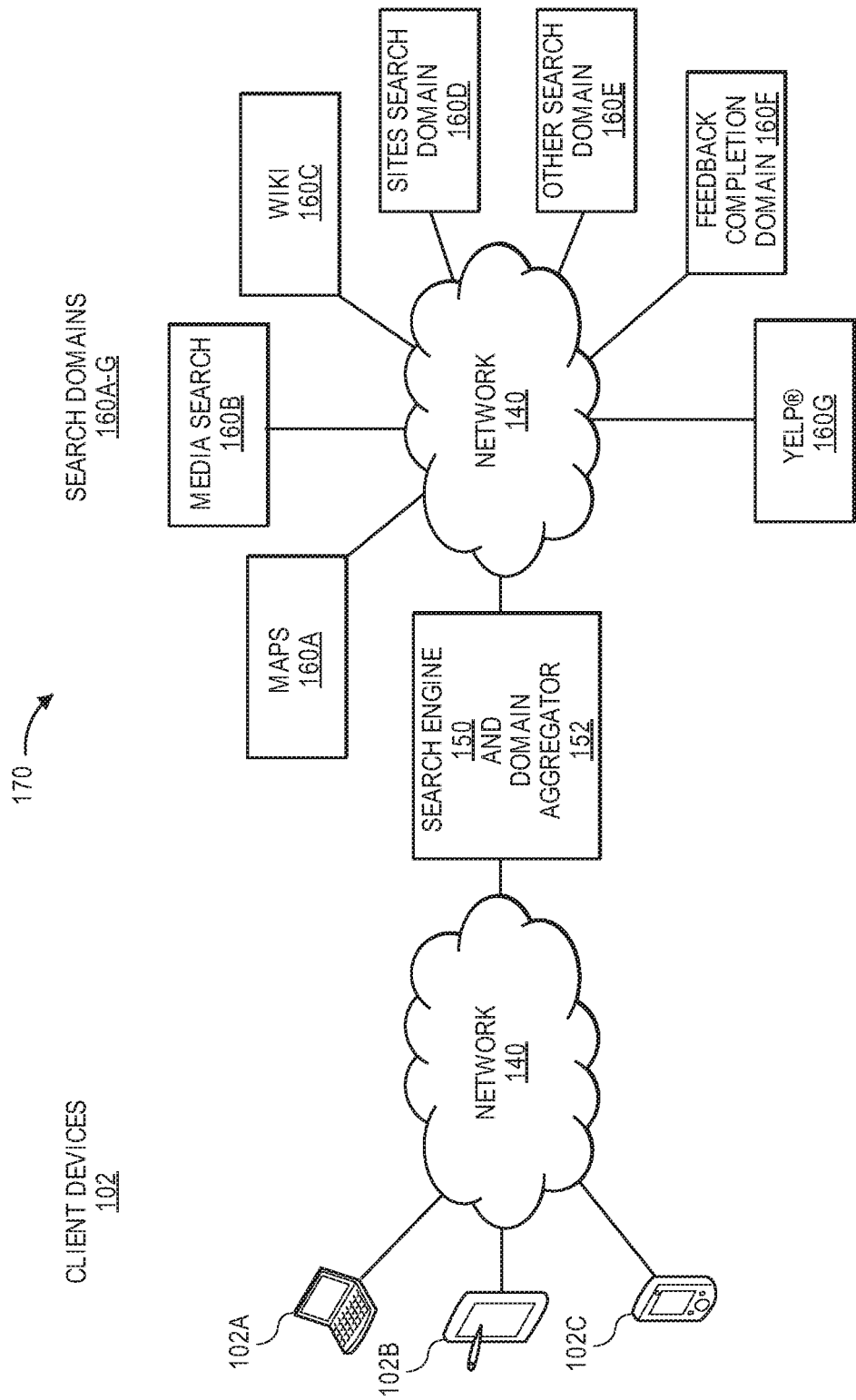
FIG. 1B is a block diagram of an exemplary system for a search engine and domain aggregator to aggregate search results returned from multiple domains in response to a query from client devices of FIG. 1A.

FIG. 1B is a block diagram of an exemplary system 170 for search engine 150 and domain aggregator 152 to aggregate search results returned from multiple domains 160A-G in response to a query from client devices 102A-C for client device 102 of FIG. 1A. Referring to FIG. 1B, client device 102 can be represented by different types of devices such as client devices 102A-C in which client device 102A can be a laptop computer, client device 102B can be a tablet, and client device 102C can be a portable hand-held device such as a cell phone or smart phone, fitness tracker, or gaming device as examples. Client devices 102A-C are coupled to search engine 150 and aggregator 152 via network 140.

In one example, when a user of client devices 102A-C initiates a query session with search engine 150, search engine 150 can generate a unique session identifier (session ID) for client devices 102A-C and can also start a session timer for the session. During the session, search engine 150 can store a history of the queries issued by the user, and can store an indication of which query results the user interacted with, and other user feedback data. The query results and feedback data can be stored by search engine 150 in association with the session ID. The stored queries and user interaction data represent a "user intent" or "query context" indicating what the user of the client devices 102A-C has been querying about during the session. Since the stored queries and interaction data are private to the user of client device 100, the information can be retained on client devices 102A-C even after the session timer has expired, thereby ending the session. When a session ends, and the user of the client device continues to interact with search engine 150 or query results returned during the session, search engine 150 can generate a new session ID and can transmit the new session ID to the user.

In one example, to preserve privacy of the user, the new session ID and the expired session ID are not associated with one another within search engine 150. In response to receiving the new session ID, client devices 102A-C can transmit "user intent" or "query context" information to search engine 150 so that search engine 150 has a context for the user's continued interaction with the search engine 150. For example, a user may be searching for flights from the San Francisco Bay Area to Portland International Airport on a specific date. When the session expires, and a new session ID is generated and transmitted to client devices 102A-C, the user intent data can be transmitted to search engine 150 in conjunction with the new session ID so that search engine 150 can continue returning query results related to flights from the San Francisco Bay Area to Portland Oreg. on a specific date. In one example, the user intent data can be anonymized before transmission to the search engine 150 by anonymization and location fuzzing service 117.

Search engine 150 can be coupled to a plurality of search domains 160A-G (collectively, search domains 160) via network 140. Search domains can be, for example, a maps domain 160A, a media search domain 160B, a Wiki domain 160C, a site's search domain 160D, and "other" search domain 160E, a feedback completion domain 160F, or a Yelp® domain 160G. Other domains can include a Twitter® domain, an iTunes® domain, a Netflix®, a LinkedIn® domain, or other search domain. Search engine 150 can receive a query from client devices 102A-C. Search engine 150 can pass the search query across network 140 to search domains 160. Search domains 160 can return query results that match the query received by search engine 150. Search engine 150 can include an aggregator 152 that aggregates query results for transmission to the querying client device 100. Aggregating query results can include grouping query results by the search domain 160 that provided a subset of the query results. Aggregating query results can alternatively, or in addition, including filtering results based upon a predetermined threshold relevance value. A relevance value from a particular query result can be determined by the search domain 160 that provided the query result. In an embodiment, a relevance value can be determined by search engine 150 or aggregator 152.

In one example, search engine 150 can determine that a particular query is a frequent, or common, query issued by users. In such a case, search engine 150 can store the query and at least some of the search results in a cache on search engine 150. In an embodiment, search engine 150 can analyze the queries received from client devices 100, the query results returned to a user, and the user feedback collected. Search engine 150 can further determine a new feature from such analysis and can further generate a predictor for search engine 150 that trains on the query and the feature over the user feedback received from one or more client devices 102A-C. In one example, search engine 150 can instruct one or more client devices 100 to train upon a predictor. Search engine 150 can further instruct one or more client devices 100 to report their respective training progress on the predictor to search engine 150.

In one example, search engine 150 can include aggregator 152 and multiple search domains 160A-G. In one example, aggregator 152 receives requests for query completions based on at least a partial input query ("input query prefix"). In response to receiving the input query prefix, aggregator 152 sends the input query prefix to each of the search domains 160A-G. Each of the search domains 160A-G uses the input query prefix to determine possible query completions in that domain. For example, map search domain 160A can receive an input query prefix and searches this domain for possible query completions. In one example, aggregator 152 receives the query completions from each of the search domains 160A-G, and ranks the received query completions based on the relevance scores for each of the completions determined by the corresponding search domain and weights based on the query prefix context.

In one example, maps search domain 160A is a search domain that includes information related to a geographical map. In this embodiment, the maps information can include information about places, addresses, places, businesses, places of interest, or other type of information relating to maps. In one example, the maps information can also include information related to places of interest, such as opening hours, reviews and ratings, contact information, directions, and/or photographs related to the place. In one example, media search domain 160B is a search domain related to media. In one example, media search domain 160B includes information related to music, books, video, classes, spoken word, podcasts, radio, and/or other types of media. In another example, media search domain 160B can include information related to applications that can run on the device, such as computing devices 102A-C.

In one example, media search domain 160B is a media store that includes different types of media available for purchase (e.g., music, books, video, classes, spoken word, podcasts, radio, applications, and/or other types of media). In one embodiment, the wiki search domain 160C is an online encyclopedia search domain. For example, wiki search domain 106C can be WIKIPEDIA. In one example, sites search domain 160D is a search domain of websites. For example, sites search domain 160D can include business, governmental, public, and/or private websites such as "apple.com," "whitehouse.gov," "yahoo.com," etc. In one embodiment, the other search domain 160E is a set of other search domains that can be accessed by the aggregator 152 (e.g., a news search domain). In one example, feedback completion domain 160F is a search index that is based on query feedback collected by browsers running on various devices. In one example, feedback completion domain 160F includes a feedback index that maps queries to results based on the collected query feedback. In one embodiment, Yelp® search domain 160G returns query results from Yelp® reviews generated by individual people commenting upon businesses which they have patronized. Yelp® query results can include tags for a price rating, e.g. "$$," and a service quality rating measured in stars, e.g. 1 to 5 stars indicating poor to excellent service.

As described above, each search domain 160A-G includes information that allows each of the search domains 160 to give a set of query completions based on an input query prefix. In one embodiment, each of the search domains includes a query completion tree that is used to determine the query completion as well as determine scores for each of those query completions. Based upon the query completions of each domain 160A-G, query results are returned to search engine 150 and domain aggregator 152 by each of the search domains 160A-G. In one example, a particular search domain in 160A-G may not return any results for a particular query. In another example, a search domain may not return any results if the particular search domain does not have any results matching the query, or if the relevance score of the results the particular search domain has are below a threshold value. The threshold value for returning results can be a part of a query received from client devices 102A-C, or set by search engine 150, domain aggregator 152, or by the particular search domain 160.

Figure 2:
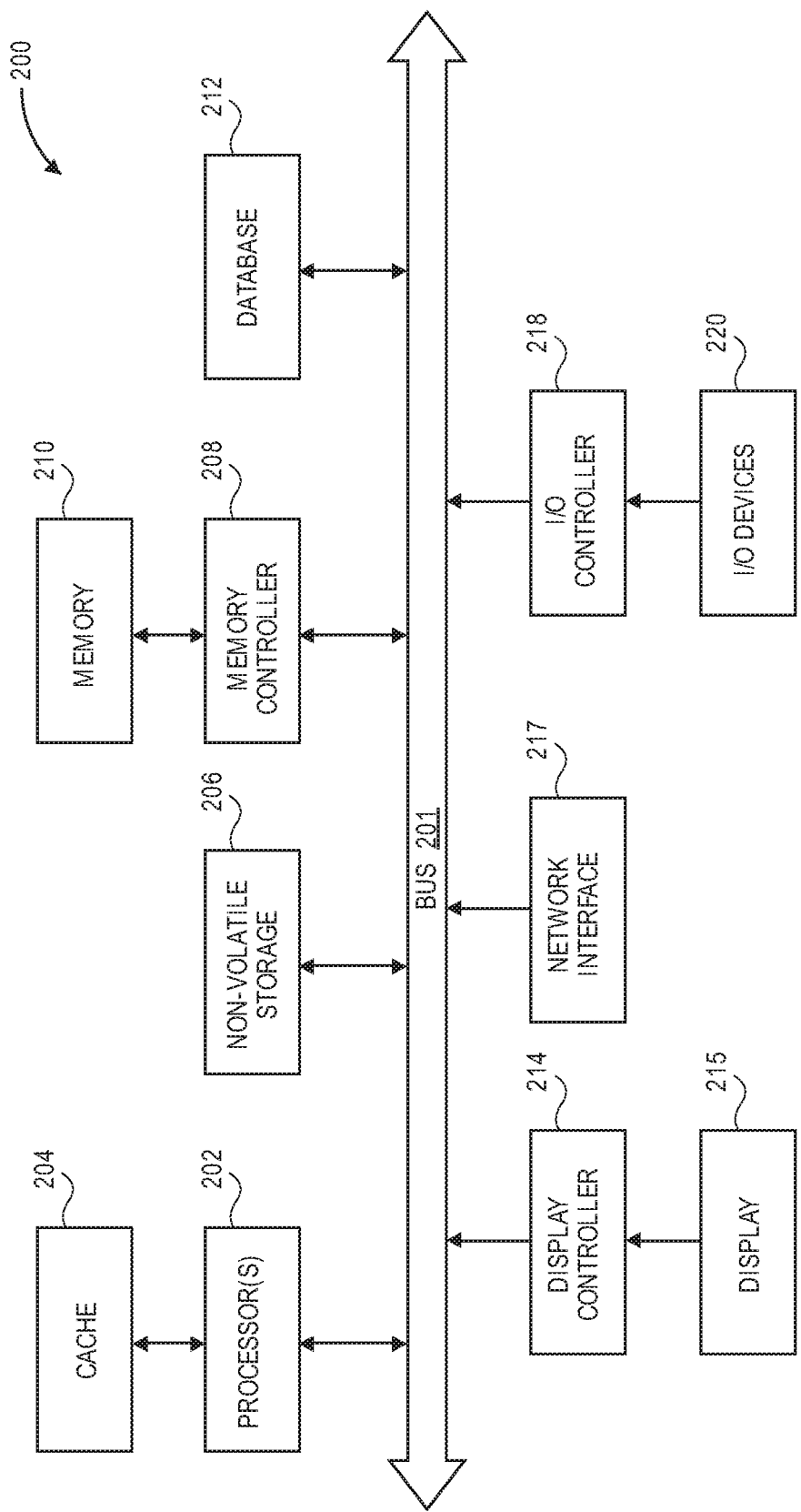
FIG. 2 is one example of a block diagram of a data processing or computing system for a client device or a server for a search engine of FIGS. 1A-1B.

FIG. 2 is one example of a block diagram of a data processing or computing system 200 for a client device 102 or a server for a search engine 150 of FIGS. 1A-1B. Computing system 200 can represent desktop computer systems, laptop computer systems, cellular telephones, personal digital assistants (PDAs) including cellular-enabled PDAs, fitness trackers, set-top boxes, entertainment systems or other consumer electronic devices. Alternative computing systems may include more, fewer and/or different components. Computing system 200 can represent a server providing a remote search engine for computing device 102.

Referring to FIG. 2, in one example, computing system 200 includes a bus 203, which is coupled to processor(s) 202 coupled to cache 204, display controller 214 coupled to a display 215, network interface 217, non-volatile storage 206, memory controller coupled to memory 210, I/O controller 218 coupled to I/O devices 220, and database 212. Processor(s) 202 can include one or more central processing units (CPUs), graphical processing units (GPUs), a specialized processor or any combination thereof. Processor(s) 202 can retrieve instructions from any of the memories including non-volatile storage 206, memory 210, or database 212, and execute the instructions to perform operations described in the disclosed examples and embodiments.

Examples of I/O devices 220 include mice, keyboards, printers and other like devices controlled by I/O controller 218. Network interface 217 can include modems, wired and wireless transceivers and communicate using any type of networking protocol including wired or wireless WAN and LAN protocols. Memory 210 can be any type of memory including random access memory (RAM), dynamic random-access memory (DRAM), which requires power continually in order to refresh or maintain the data in the memory. Non-volatile storage 206 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

In one example, network interface 217 provides access to network 104 of FIGS. 1A-1B, which can be a wide area network (WAN) or a local area network (LAN). Network interface 217 may include, for example, a wireless network interface having antenna 1385, which may represent one or more antenna(e). In one example, computing system 200 can include multiple wireless network interfaces such as a combination of Wi-Fi, Bluetooth® and cellular telephony interfaces. Network interface 217 may also include, for example, a wired network interface to communicate with a remote server providing remote search engine 150 via network 140. In one example, network interface 217 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface 217 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Database 212 is used by computing system 200 and can store massive amounts of data including indexing data used by search engine 150 or local query service 114 and remote query service 121 of FIG. 1A. And, in one example, database 212 can store or be the same as local database of FIG. 1A. Database 212 can also store ML models or other statistical or probabilistic models to implement the techniques in the disclosed examples and embodiments. Although database 212 is shown coupled to system bus 201, computing system 200 can be coupled to any number of external databases locally or remotely connected to computing system 200 via network interface 217. In one example, computing system 200 can be a server having search engine 150 using database 212.

Improved Client Side Search Ranking Techniques

Figure 3A:
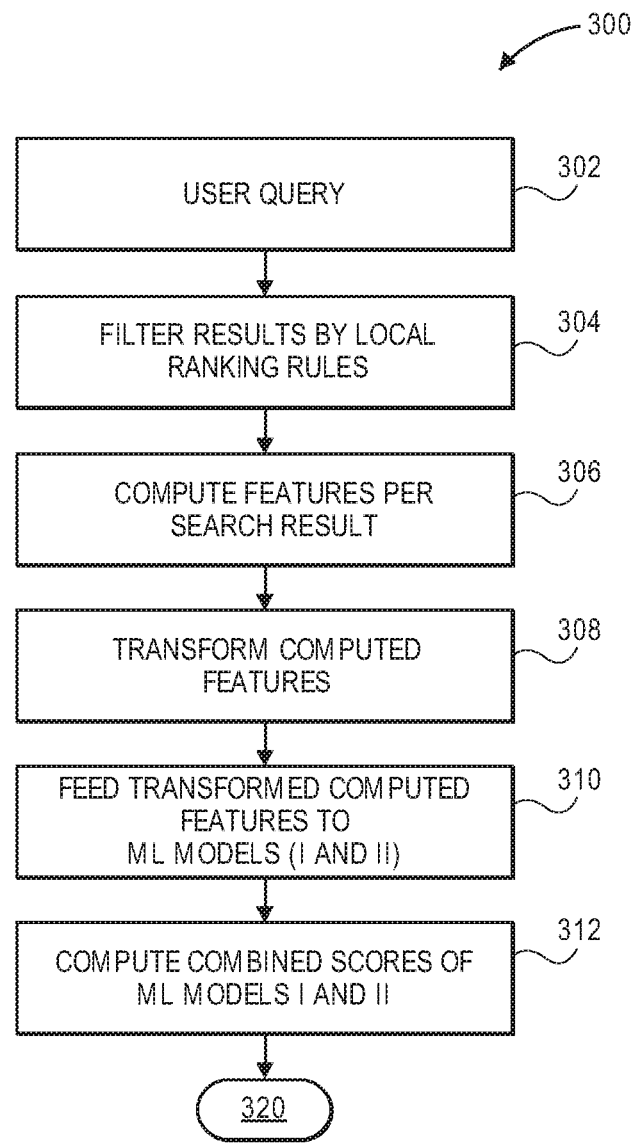
FIGS. 3A-3C are example flow diagrams of operations for improved client side search ranking of query results.
Figure 3B:
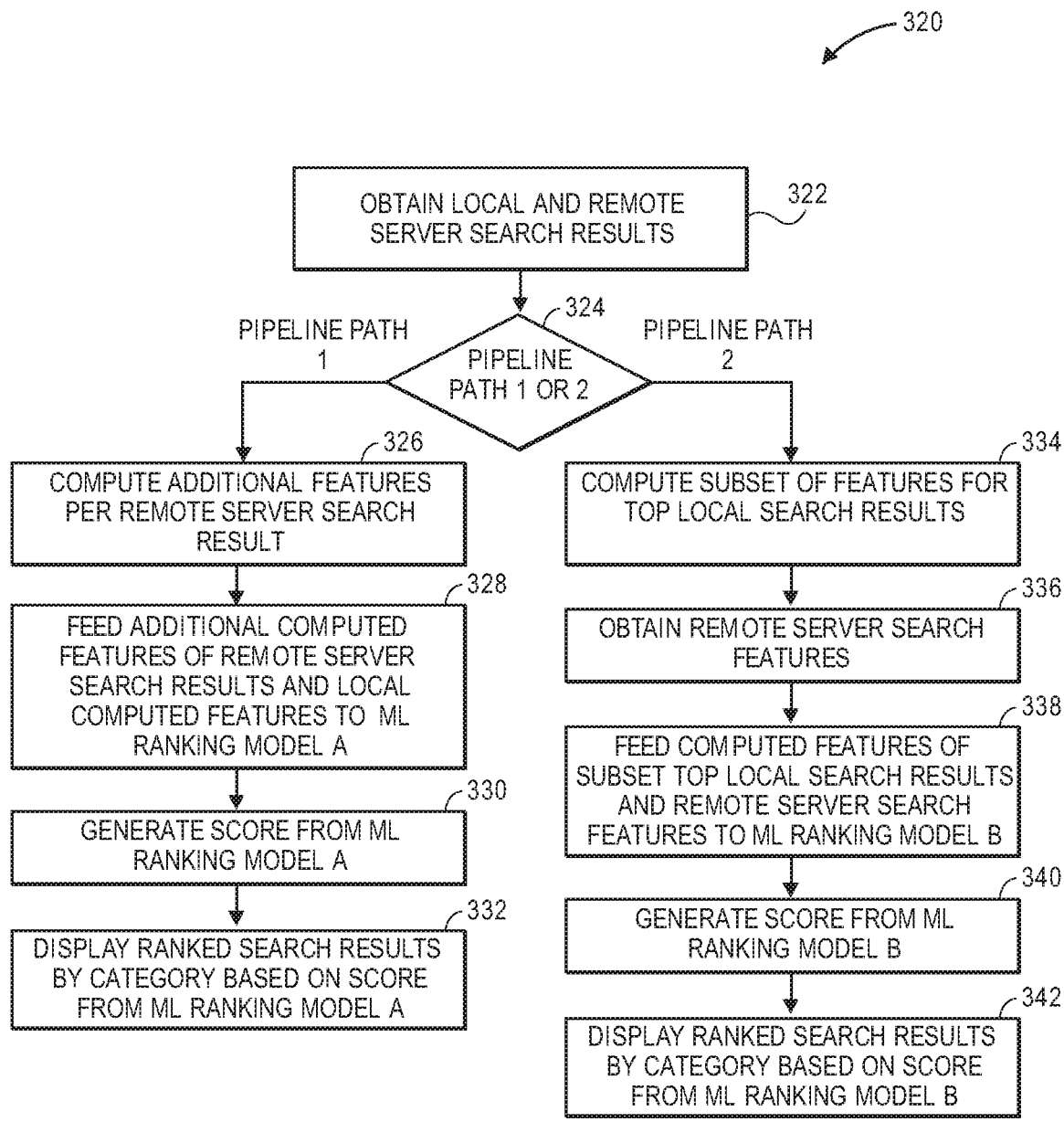

FIGS. 3A-3B illustrate one example of operations 300 and 350 for improved client side search ranking of query results which can be implemented by a client device (e.g., client device 102 of FIGS. 1A-1B). Operation 300 of FIG. 3A includes operations 302 through 312. Operation 320 of FIG. 3B includes operations 322 through 342.

Referring to FIG. 3A, at operation 302, a user query is issued using, e.g., local search interface 110 of FIG. 1A. As described above, local search interface 110 can pass the query to one, or both, of local database 111 and remote search engine 150 via local query service 114 or remote query service 121, respectively. Search results can be provided from both the local query service 114 and remote query service 121 from local or remote search domains. A user query can be a single term, e.g., "pizza", "bars", "john" etc. A user query can also be a phrase, e.g., "baseball games", "rock concerts", etc. or groups of phrases, sentences, or questions. A user query can also be prefix of a query that the user is intending to type out, e.g., a user my type "yel" for the application "Yelp." Each word, term, or phrase in the user query can have an index in a database corresponding to content such as, e.g., files, documents, messages, emails, etc. In one example, search results can include indexed content related to the user query locally found on client device 102 (e.g., from a local search domain) as local search results.

At operation 304, in one example, local search results from a local search domain are filtered using local ranking rules. Initial search results can identify a large number of documents, files, or content indexed to the user query found locally or in a local domain on client device 102, e.g., in local database 111, which can be filtered and reduced in size using ranking rules. In one example, in order to identify relevant search results for a user, the local search results can be filtered and ranked using ranking rules, e.g., local ranking rule examples 402 of FIG. 4A. Referring to FIG. 4A, ranking rules can include any number of ranking rules such as Rule 1 through Rule N. Each ranking rule relates to an attribute and is applied to each local search result to determine a score for ranking the local search results within a category. For example, Rule 1 can determine if local search results have attributes such as exact/fuzzy match with the user query. Rules 2-11 can determine if local search results have attributes related to or found in, e.g., a VIP contact list, phone favorites, phrase match, topic, flagged email, tagged files, file names, texts content, artists, and authors up to Rule N for any type of ranking rule.

Figure 4B:
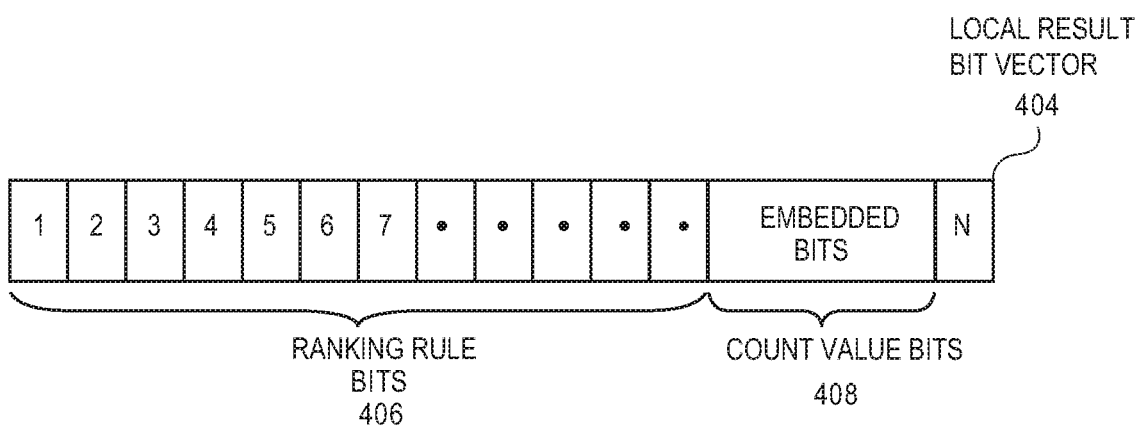
FIGS. 4B-4C are examples of local result bit vectors.
Figure 4C:
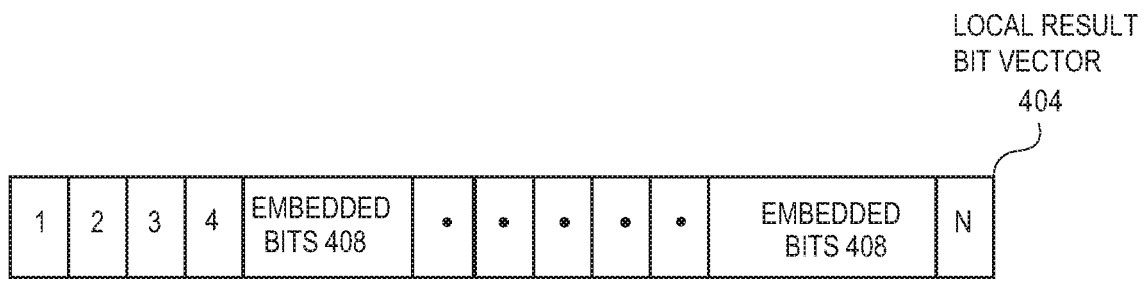

In one example, each local search result can be given a score using a local result bit vector 404 described in FIGS. 4B-4C. The local result bit vector 404 can include bits 1 through N including ranking rule bits 406 and count value bits 408 which can be embedded bits in bit vector 404. Ranking rule bits 406 can be individual bits where each bit represents a ranking rule, e.g., local ranking rule examples 402 in FIG. 4A. If the local search result has an attribute related to a ranking rule, its corresponding bit can be set to "1" and if not its corresponding bit is set to "0." For example, bit 2 can represent the VIP Contact List, and if its search result has an attribute related to the VIP Contact List, bit 2 would be set to "1." That is, the search result could be an email from a person in the VIP Contact List and its bit 2 would then be set to "1." In one example, count value bits 408 can provide a count value corresponding to the number of matches for one of the ranking rules for the local search result. This number can be used to rank the local search results within a category. In one example, count value bits 408 can be a fixed combination of embedded bits 408 in any location within bit vector 404, which is shown at the end of the bit vector 404 in FIG. 4B, and can be embedded in bits 1 through N of local result bit vector 404 as shown in FIG. 4C. Any number of count values or embedded bits 408 can be used in bit vector 404 to provide other count values such as, e.g., the number of exact or fuzzy matches with a search query. In one example, relevance of information related to ranking rule bits 406 and count value bits 408 can be determined based on location within bit vector 404, e.g., more relevant information can be located at the left of bit vector 404 and least relevant information at the right of bit vector 404.

Referring to FIGS. 4B-4C, in one example, each local search result can have a respective local result bit vector 404 including ranking rule bits 406 and a number of sets of count value 408, where each set of count value bits comprise a number of embedded bits. For example, count value bits set A can have a different number of embedded bits from count value set B which can represent a number of ranking rules related to attributes of the local search result. This number, in one example, can represent a score for the local search result. In one example, the number represented by corresponding sets of count value bits 408 of each bit vector 404 for a local search result can be compared to rank the local search results based on the compared numbers. For example, local search results with bit vectors 404 having count values with higher numbers can be ranked higher than other local search results with bit vectors having count values with lower numbers. In one example, the top number of local search results, e.g., top 20, per ranking rule within a category based on the score or count value from the local result bit vector 404 are selected as filtered local search results for further processing in order to display the most relevant local search results to a user.

In one example, local result bit vector 404 can be stored in local search and feedback history 115 or in local database 111 or data 1113 for later use. Bit vector 404 can also provide information for machine learning (ML) models or algorithms in ranking local search results to be displayed to a user via local search interface 110. In other examples, bit vector 404 can provide metadata information used by search engines.

At operation 306, features are computed per filtered local search result. For example, features for the top number of local search results by ranking rules can be computed for further processing in determining which local search results are relevant for display to the user. In one example, any number of features can be computed for the filtered local search results in operation 304. Computed features can include ranking values or Boolean values, e.g., as illustrated in computed feature examples of FIGS. 5A-5B. In some examples, thousands of features can be computed for filtered search results in each category. Referring to FIG. 5A, an example of computing ranking values is shown as computed features 508. For example, a user query can pull search results from a local domain to client device 102 from contacts and filtered to a "phone favorites" category in which search results are indexed to contacts 502 and facetime calls 504. Most recent call feature 506 can be computed that provides ranking values as computed features 508 indicating which facetime calls were most recent in connection with a particular contact such as Contacts A-C and ranked as 1, 2 and 3. In this example, "1" refers to the most recent facetime call with Contact A and "3" refers to the latest facetime call with Contact C. Ranking can be based on any number of criteria, e.g., document last used etc.

In one example, search results can be indexed for contacts 502 listing Contacts A-C tied to specific dates in which facetime calls 504 were made. Computed features 508 can provide useful information without divulging private data 505 such as the exact dates facetime calls 504 were made. In this example, Contact A made a facetime call on May 15, 2017, Contact B made a facetime call on May 12, 2017, and Contact C made a facetime call on Jan. 5, 2016. The exact dates for these facetime calls can be considered private data 505 and would not be designated for distribution or use. To anonymized private data 505, most recent call feature 506 can be computed by giving ranking values "1", "2" and "3" to identify the most recent facetime call to Contact A without identifying exact dates of the facetime calls, which may expose or identify the user or contact and private data 505.

Thus, private data 505 can be anonymized or masked while providing useful feature information giving indications on how a user interacts with client device 102.

Referring to FIG. 5B, an example of computing Boolean values is shown as computed features 518. For example, a user query can pull search results from documents in the "phrase match" category in which search results are indexed to documents 512 and last used date 514. Last used timeline feature 516 can be computed that provides computed values 518 providing timeline information on when documents 512 were last used. In one example, documents 512 includes three documents (DOC 1, DOC 2, and DOC 3) matching a user query. Last used date 512 can indicate that DOC 1 was last used, e.g., on May 16, 2017, and DOC 2 was last used on May 8, 2017, and DOC 3 was last used on Jan. 1, 2016. Last used data 514 can be considered private data 515, which should not be distributed or shared. In masking private data 515, last used timeline features 516 can be computed providing computed features 518 such as:

| <24 hours | <1 week | <1 month | <1 year |
|---|---|---|---|
| 0 | 0 | 0 | 1 |
| 0 | 0 | 0 | 1 |
| 0 | 0 | 0 | 0 |

In the above timeline for computed feature 518, e.g., the "1" under <1 year indicates a Boolean value that a document, e.g., DOCS 1 and 2 was last used less than a year ago, and a "0" indicates a Boolean value that a document was not last used, e.g., <24 hours ago etc. Any type of Boolean expression can be used to determine Boolean values, e.g., are text messages from Contact A, was music file played last, etc. These Boolean values can also mask exact dates of the last time the document was used in hiding private data 505. Computed features can be provided for search results according to local ranking rule examples 402 or any other additional categories which can be used by local query service 114 and remote query service 121 in ranking search results for a user.

Figure 6:
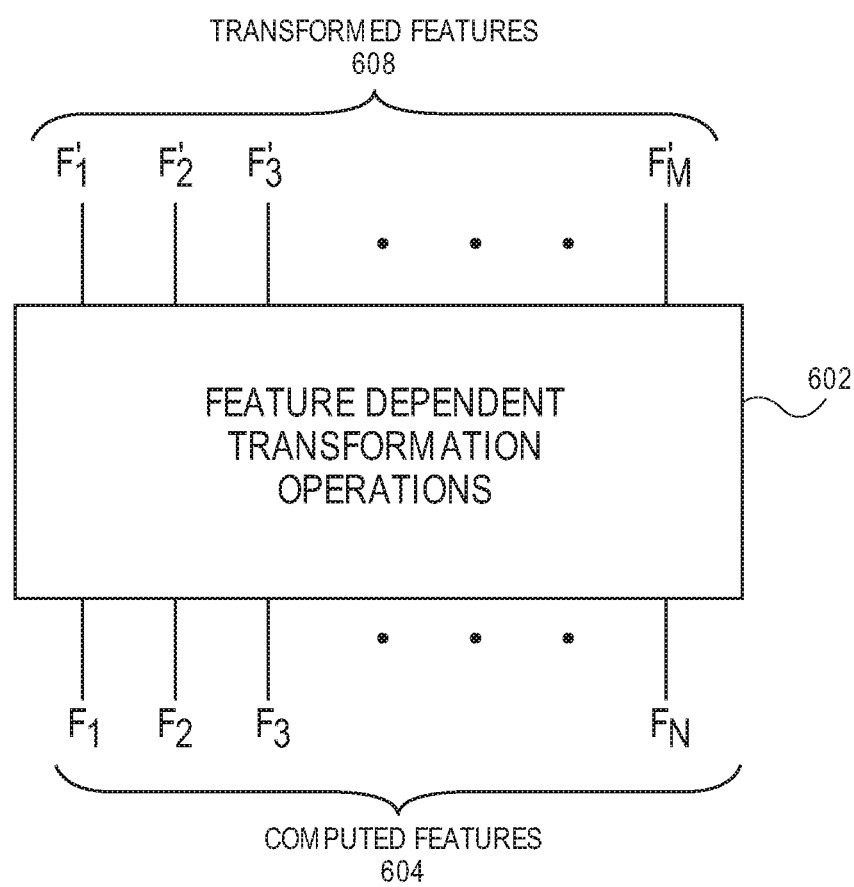
FIG. 6 is one example block diagram of machine learning (ML) algorithms generating transformed features based on computed features.

At operation 308, computed features can be transformed based on feature dependent transformation operations in a format for a ML model to process and understand. For example, referring to FIG. 6, computed features 604 can have ranking or Boolean values, e.g., as shown in FIGS. 5A-5B. In one example, feature dependent transformation operations 602 can implement one hot encoding on computed features 604 which can transform categorical features to a format that works better with ML algorithms. For example, referring to FIG. 5A, computed features 508 of 1 2 3 can be for Contacts A-C can be transformed by one hot encoding such that only Boolean values are provided for each Contact A-C in categories, e.g., was face time call most recent, second most recent, and third most recent and either a "1" or "0" is used for that category expression for Contacts A-C. In other examples, feature dependent transformation operations 602 can apply mathematical operations (or weights) such as multiplying or adding numbers to generate different values, e.g., floating point numbers, for use by the ML models depending on computing architecture used. In some examples, computed features 604 can pass directly on a one-to-one basis to ML models without transformation. In one example, computed features 604 can include computed features $F_1$ through $F_N$. Operations 602 can transform one or more of the computed features $F_1$ through $F_N$ to generate and output transformed features $F'_1$ through $F'_M$. In one example, M and N can be the same integer or, in another example, M<N or M>N in which the number of transformed features 608 is reduced or increased in size compared to computed features 604. For example, outputs for transformed features $F'_1$ through $F'_M$ can have integers added to ranking values such as 1, 2, or 3 so ML models can understand and process them or divided by an integer. In other examples, a computed feature for a result in a category can be a Boolean value and transformed into multiple features with the same Boolean value across multiple categories for use by a ML model.

Figure 7A:
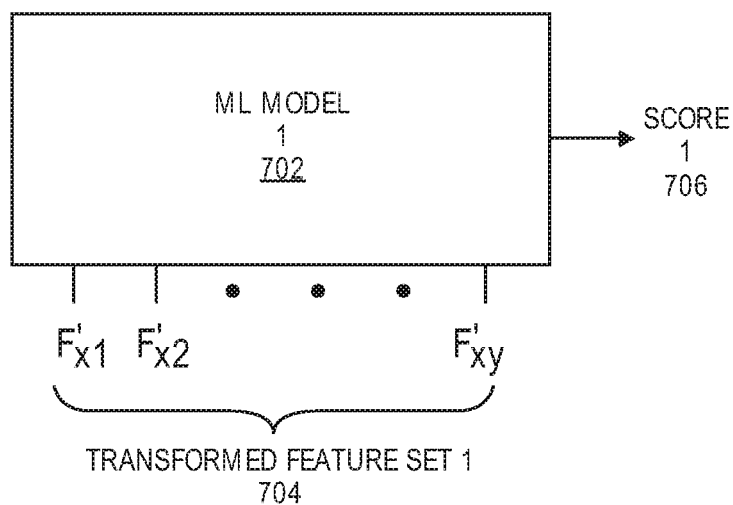
FIGS. 7A-7B are exemplary block diagrams of ML models generating scores for ranking local search results.
Figure 7B:
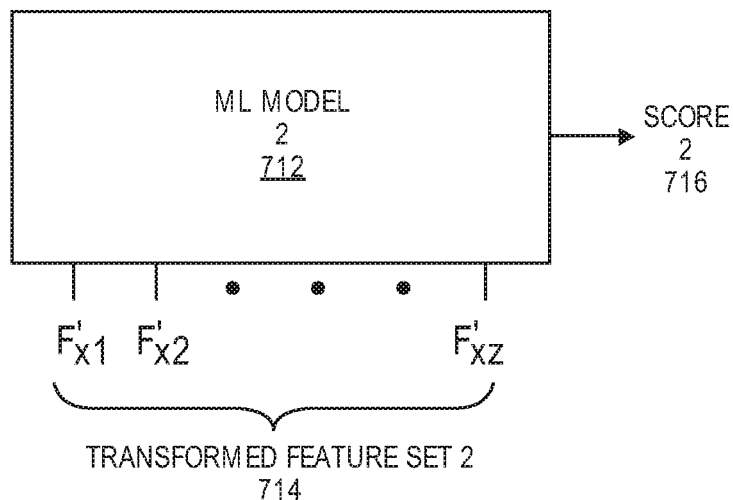

At operation 310, the transformed computed features (e.g., transformed computed features 608) for each search result in a category are fed into ML models to obtain a score for the search results in the category. Any number of ML models can be used to generate scores for further ranking the search results within a category. In one example, each ML model can be trained on different data and focus on different features of the search results to improve ranking of search results. Referring to FIGS. 7A-7B, in one example, two ML models I and II (702, 712) are implemented receiving as inputs transformed feature set 1 (704) and transformed feature set 2 (714) based on transformed features 608 in FIG. 6, respectively. For example, ML models I and II can process different transformed features and apply boosting if necessary to improve ranking of search results per category. In one example, transformed feature set 1 (704) can include features $F'_{X1}$ through $F'_{XY}$ and fed into ML model I (702), which can a subset of transformed features 608. In one example, transformed feature set 2 (714) can include features $F_{Y1}$ through $F'_{YZ}$ and fed into ML model II (712), which can be a different subset of transformed features 608. In one example, ML models I and II (702, 712) can include ML models disclosed in U.S. patent application Ser. No. 14/721,945, entitled "MACHINE LEARNING BASED SEARCH IMPROVEMENT," filed on May 26, 2015, which is commonly assigned and incorporated herein by reference.

At operation 312, transformed feature sets 1 and 2 (704, 714) can be input into ML models I and II (702, 712) that generate scores 1 and 2 (706, 716), which can be combined for each search result in a category. In one example, scores 1 and 2 are combined to generate a combined score used for ranking search results per category related to transformed features 608. For example, a combined score can be calculated as: W1×Score 1+W2×Score 2—where W1 and W2 and weights which can be tuned according changing search habits of a user or a system. For example, depending on features processed by Score 2, that score can be given a higher weighting using W2 for a particular user and Score 1 can be given a lower weighting using W1. In one example, the search results in each category can be ranked using the combined scores. In some examples, a single ML can be used and a single score is generated, which can be weighted and user for ranking results per category. Operation 300 can continue to operation 320 in FIG. 3B.

In one example, ML models I and II (702, 7212) can include neural networks having any number of layers and nodes as known in ML modeling. Computed features 608 or transformed features sets 1 and 2 (704, 714) can feed into nodes of the lower layer of the neural network, where there is a set of intermediate layers with receiving nodes and a final layer of nodes. The output of the final layer of nodes can provide predictive information on whether a search result is likely to be engaged or unlikely to be engaged, e.g., score 1 (706) or score 2 (716) which can be used to rank search results. Each node can apply weighted values for each input and the ML model can be trained such that the final nodes output predictive information with known outcomes. In other examples, decision trees can be sued for the ML model, and any type of ML model can be used to generate outputs for transformed features 604.

For example, referring to FIGS. 5A-5B, most recent facetime call feature 506 can represent $F'_1$ and last used timeline feature 516 can represent $F'_2$ as part of transformed features 608 input to ML models I or II (702, 712). In one example, Boolean terms using transformed features 506 and 516 can be used by ML models I or II, e.g., "is most recent facetime call from Contact A and was DOC 1 used more than a year ago," which can be fed into a decision tree providing provide predictive values as score 1 and 2 (706, 716) for a search result. For example, score 1 (706) can be given a value 0.75 by ML model I (702) indicating that 75% of the time if most recent facetime call is from Contact A it is relevant. Such predictive values for transformed features 608 can be given for each search result in operation 304. Any type of predictive ML modeling can be used including linear equations such as $F=a*x+b$ for ML models I and II (702, 712) where "a" is weighted value, "x" is computed feature, and "b" a constant value.

Referring to FIG. 3B, at operation 322, local and remote server search results can be obtained. For example, referring to FIG. 1A, local search interface 110 can pass a search query to local query service 114 and remote query service 121 in the remote search subsystem 135 of client device 102, via communication interface paths 1 and 7, so that local search interface 110 receives search results from both the local database 111 and from remote search engine 150. In one example, local search results are initially ranked using scores from ML models in operation 312 of FIG. 3A, and remote search results can be initially ranked. In one example, local and remote search results can be result specific or result set specific for processing down pipeline path 1 or pipeline path 2.

At operation 324, obtained local and remote search results are processed down pipeline path 1 or pipeline path 2 using one or more ML ranking models (e.g., ML ranking models can rank search results of different types) to display ranked search results within a category to a user. In one example, pipeline path 1 can feed or be input to a ML ranking model (e.g., ML ranking model A referring to a ML model for pipeline path 1) the computed features from operation 306 for local search results and additional computed features for each remote server search results. In another example, pipeline path 2 can feed a different ML ranking model (e.g., ML ranking model B for a ML model for pipeline path 2) a subset of computed features for the top ranked search results from each category in operation 306 and remote server search features along with results. ML ranking models A and B can be machine learning models trained to rank search results of different types. In one example, ML ranking models disclosed in U.S. patent application Ser. No. 15/648,364, entitled "RE-RANKING SEARCH RESULTS USING BLENDED LEARNING MODELS," filed on Jul. 12, 2017, which is commonly assigned and incorporated herein by reference, can be used. In other examples, for pipeline path 1 or 2, any number of ML ranking models can be used to further improve ranking of local and remote server search results. In one example, based on user feedback or performance of the different ML models, pipeline path 1 or pipeline path 2 can be selected for processing the local and remote server search results. In one example, a remote server can send instructions to client device 102 to select pipeline path 1 or pipeline path 2 for processing the local and remote search results.

For pipeline path 1, at operation 326, additional features from remote server search results are computed per result providing ranking values or Boolean values. In one example, remote server search results can have results displayed within different categories than local search results. In one example, categories for the search results can be ranked. Examples of remote server search result categories can include music, movies, website categories, etc. In one example, a set number of features are computed for each remote server search results, which can be fed to ML ranking model A for pipeline path 1 to rank the categories of search results. Features for server search results can be computed to provide ranking values or Boolean values and transformed prior to processing by ML ranking model A.

At operations 328 and 330, the additional computed features from operation 326 and local computed features are fed or input to blended ML model A for pipeline path 1. In one example, local computed features can include filtered results by local ranking rules in operation 304 of FIG. 3A. In other examples, local computed features can include computed features 604 or transformed features 608 of FIG. 6. ML ranking model A can then be used to generate a score used to and rank categories of search results from the local and remote server search results. At operation 332, the local and remote server search results are ranked within a category and displayed based on the score from the ML ranking model A as illustrated in FIGS. 8A-8D using an example user query. In one example, a category for remote search results can have a higher score than a category for local search results and displayed to the user at the top of a list and vice versa a category for local search results can have higher score than a category for remote search results and displayed at the top as shown in FIGS. 8A-8D.

For pipeline path 2, at operation 334, a subset of features of the top local search results per category are computed. In one example, the top local computed features can include a set of number of the top ranked filtered results by local ranking rules in operation 304 of FIG. 3A. In other examples, the top local computed features can include a set of number of the top computed features 604 or transformed features 608 of FIG. 6.

At operation 336, remote server search features and results are obtained. For example, referring to FIG. 1A, remote search engine 150 can provide client device 102 by way remote search interface remote search results in different categories and features which can also be initially ranked. At operation 338, the computed features of the subset of top local search results and remote server search results and features are fed or input to ML ranking model B for pipeline path 2 to generate and score and rank the categories for the local and remote server search results based on the generated score. At operations 340 and 342, a score is generated from the ML ranking model B the local and remote search results are ranked and displayed within a category based on the generated score from the ML ranking model B as illustrated in the examples of FIGS. 8A-8D.

Figure 3C:
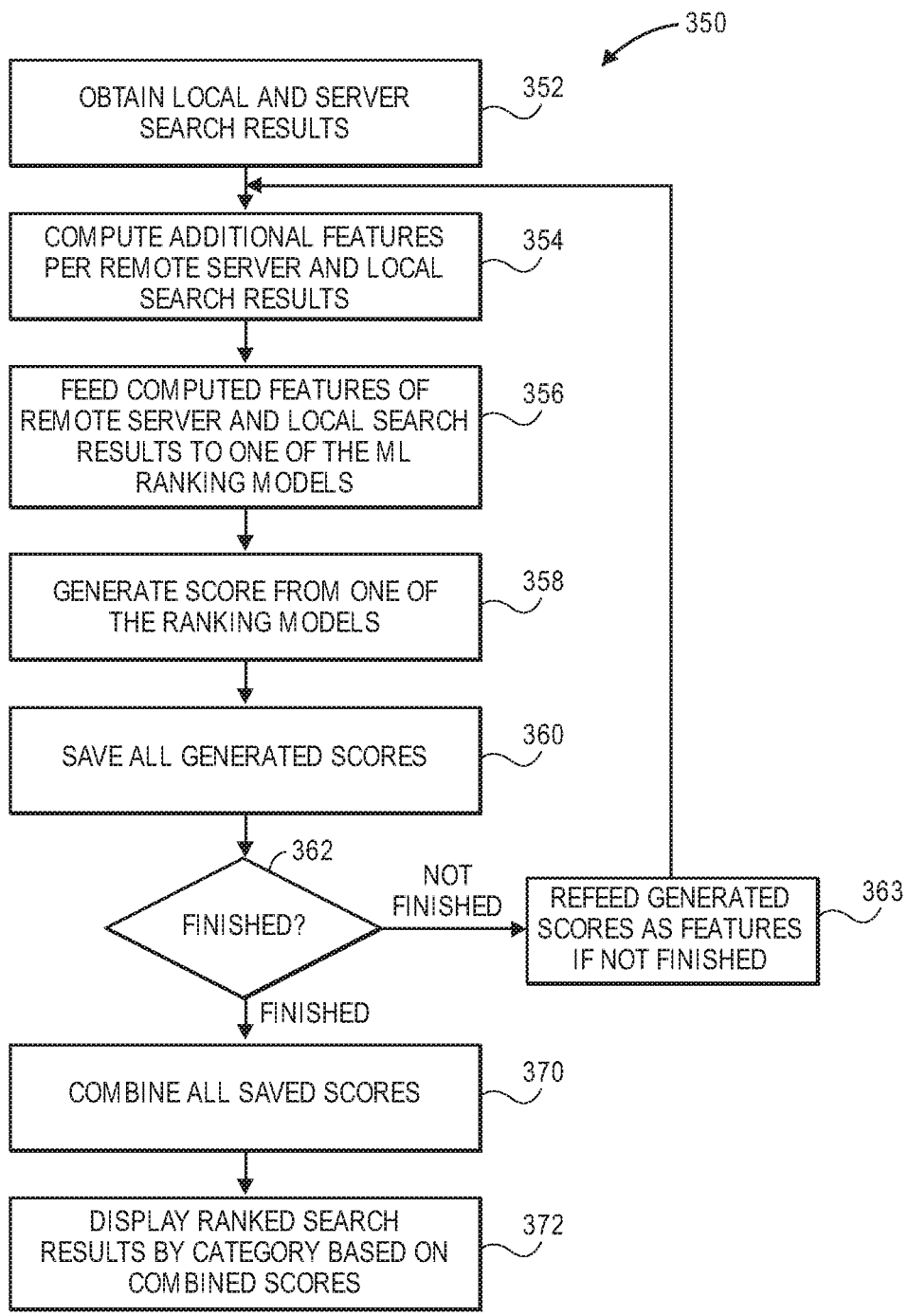

Referring to FIG. 3C, in another example, operation 350 includes operations 352-372. At operation 352, local and remote server search results are obtained. At operation 354, additional features are computed per remote server and local search results. At operation 356, the computed features of remote server and local search results are fed to one of the ML ranking models. At operation 358, a score is generated from one of the ML ranking models. At operation 360, the generated scores are saved. At operation 362, a determination is made if saving all the generated scores is finished. At operation 363, the operation refeeds generated scores as features if not finished to compute additional features at operation 354. At operation 370, if finished, all of the saved scores can be combined to rank the search results. At operation 372, the ranked search results by category are displayed based on the combined scores.

User Query and Improved Search Result Ranking Example

FIGS. 8A-8D are example flow diagrams of processing an example user query to provide improved search results by category based on the operations 300 and 320 disclosed in FIGS. 3A and 3B.

Figure 8A:
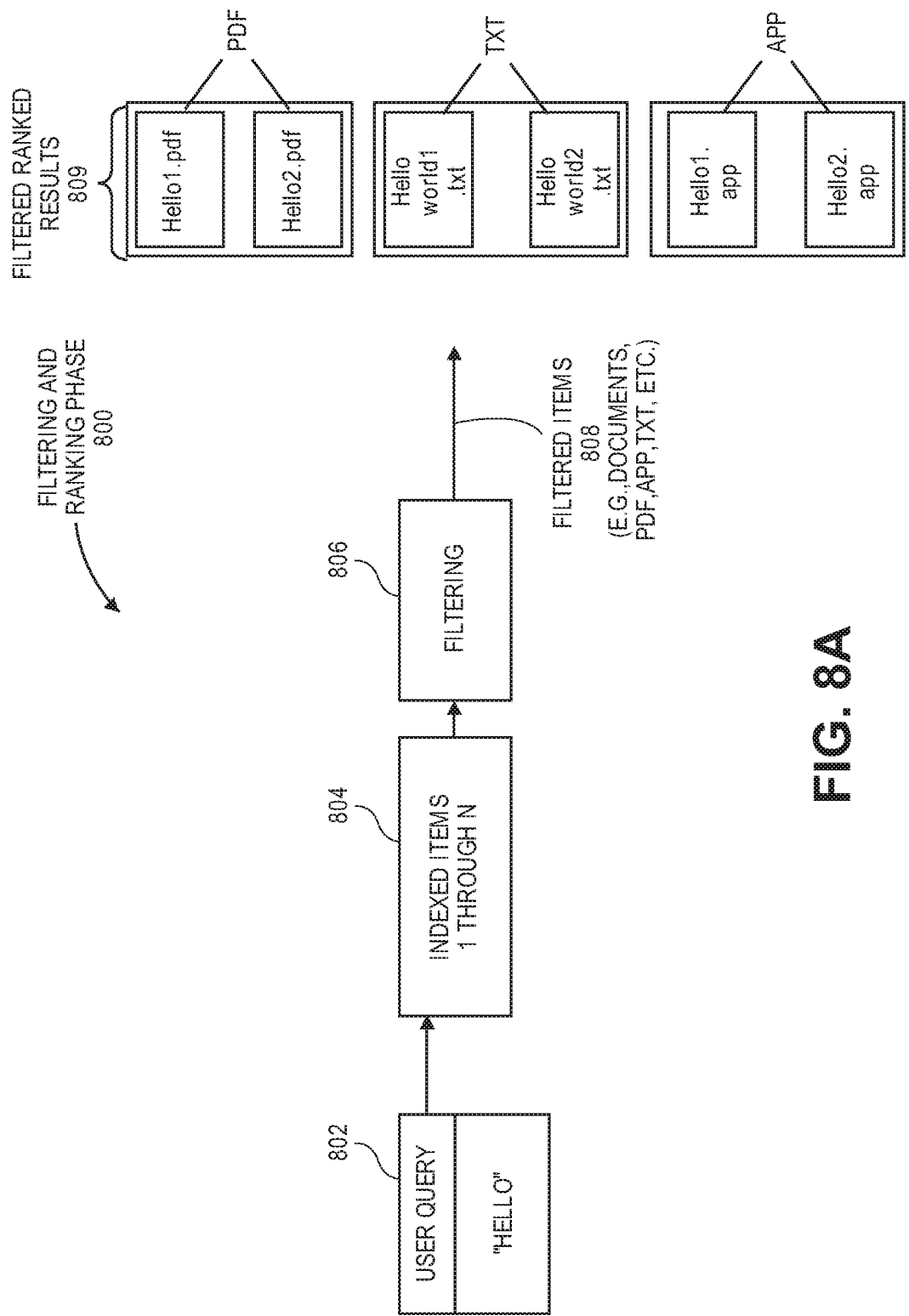
FIGS. 8A-8D are example flow diagrams of processing a user query to provide improved search result ranking by categories.

Referring to FIG. 8A, filtering and ranking phase 800 is shown. At block 802, a user of client device 102 can input a user query 802, e.g., "HELLO" into a local search interface 110 (e.g., operation 302). In one example, at block 804, local query service 114 can pull or identify indexed items 1 through N for the user query "HELLO" from local database 111. Indexed items 804 can initially contain hundreds or thousands of items such as, e.g., documents, files, apps, texts, etc. At block 806, the indexed items 804 are filtered by category or rule, e.g., using local ranking rule category examples 402 shown in FIG. 4A (e.g., operation 304 in FIG. 3A), to obtain a smaller set of filtered items 808 ranked per category as filtered ranked results 809. Categories of filtered items 808 can include PDF files, TXT files, and APP files in which the categories can be ranked. For the PDF category, Hello1.pdf can have a result vector count value (e.g., result vector 404 in FIG. 4B) higher than Hello2.pdf and displayed at the top in the PDF category based on this count value indicating the number of categories the item can be found. Likewise, Helloworld1.txt can have a higher count value than Helloworld2.txt in the TXT category, and Hello1.app can have a higher count value than Hello2.app in the APP category and displayed at the top of respective categories as shown in FIG. 8A.

Figure 8B:
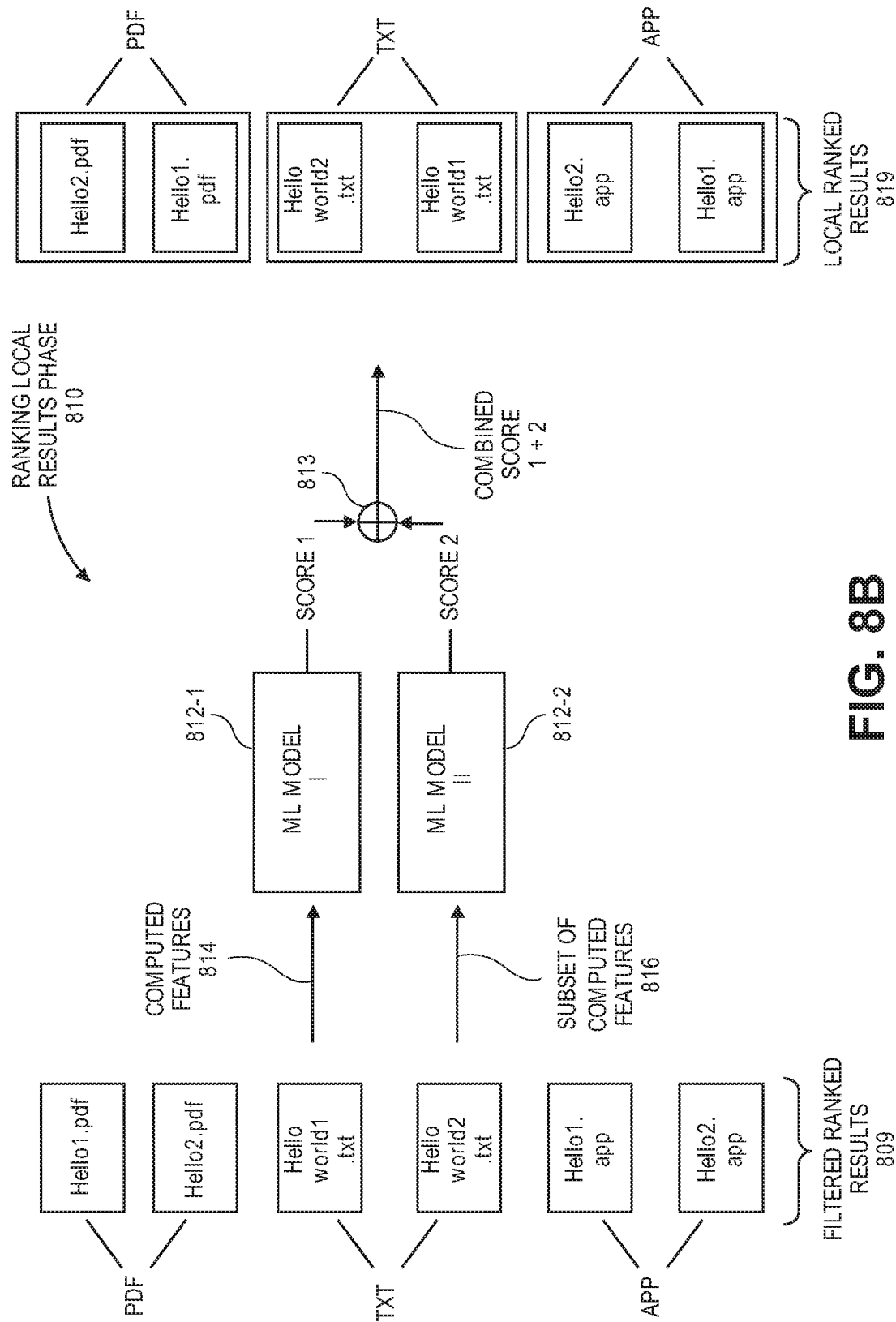

Referring to FIG. 8B, ranking local results phase 810 is shown. At block 812-1 and block 812-2 two ML models (I and II) receive or are fed computed features 814 for filtered ranked results 809 and subset of computed features 816 to ML model I and ML model II respectively (e.g., operation 306, 308, and 310 of FIG. 3A). Computed features 814 and subset of computed features 816 can be transformed as described in FIGS. 6, 7A-7B. In one example, subset of computed features 816 contains a smaller set of computed features in computed features 814 in which ML model II focuses on a smaller set of computed features. Each of the ML models I and II generates score 1 and 2 which are combined (e.g., operation 312 of FIG. 3A). The combined score can be used to rank items in local ranked results 819 by category, e.g., PDF, TXT, and APP. In local ranked results 819, for the PDF category, Hello2.pdf had a higher score than Hello1.pdf, and for TXT category, Helloworld2.txt had a higher score than Helloworld1.txt, and, for the APP category, Hello2.app had a higher score than Hello1.app in with the higher score items are displayed on top.

Figure 8C:
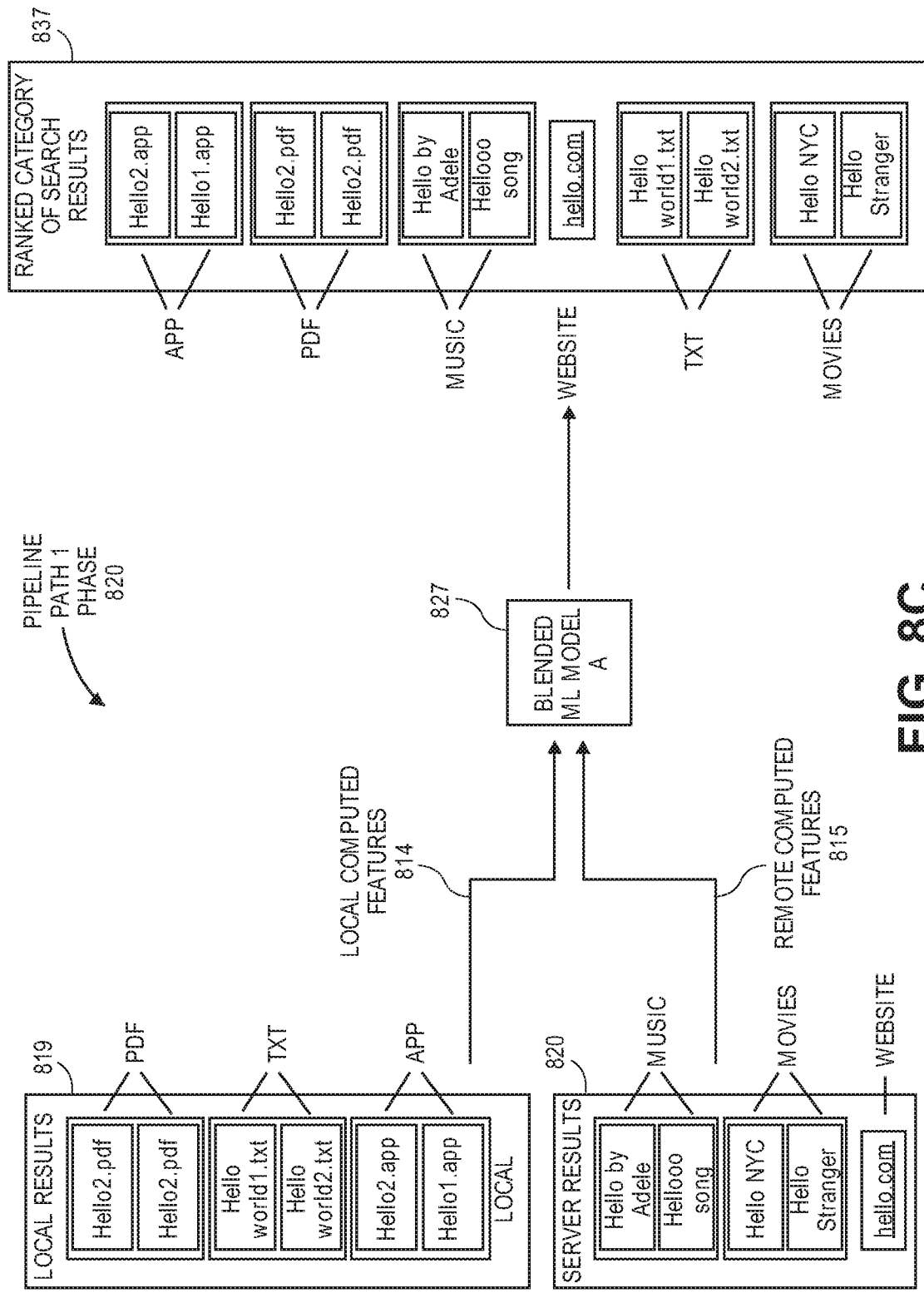

Referring to FIG. 8C, pipeline path 1 phase 820 is shown (e.g., operations 324 through 332) At blocks 819 and 820, local and remote search results are obtained. In one example, local results 819 are local ranked results 819 from FIG. 8B. Server results 820 can include initially ranked items in categories, e.g., Music, Movies, Website. For example, for the Music category, remote search results can include Hello by Adele, Hello song, etc. For Movies, remote search results can include Hello NYC, Hello Stranger, etc. For Website, remote results can include hello.com. At block 827, in one example, a blended ML model A receives or is fed computed local computed features 814 and remote computed features 815. Blended ML model A can generate a score for each category from local results 819 and server results 820 and the categories can be ranked and displayed accordingly in ranked category of search results 837. As shown, e.g., the ranking of categories from highest to lowest is App, PDF, Music, Website, Txt, and Movies with ranked items accordingly in each category.

Figure 8D:
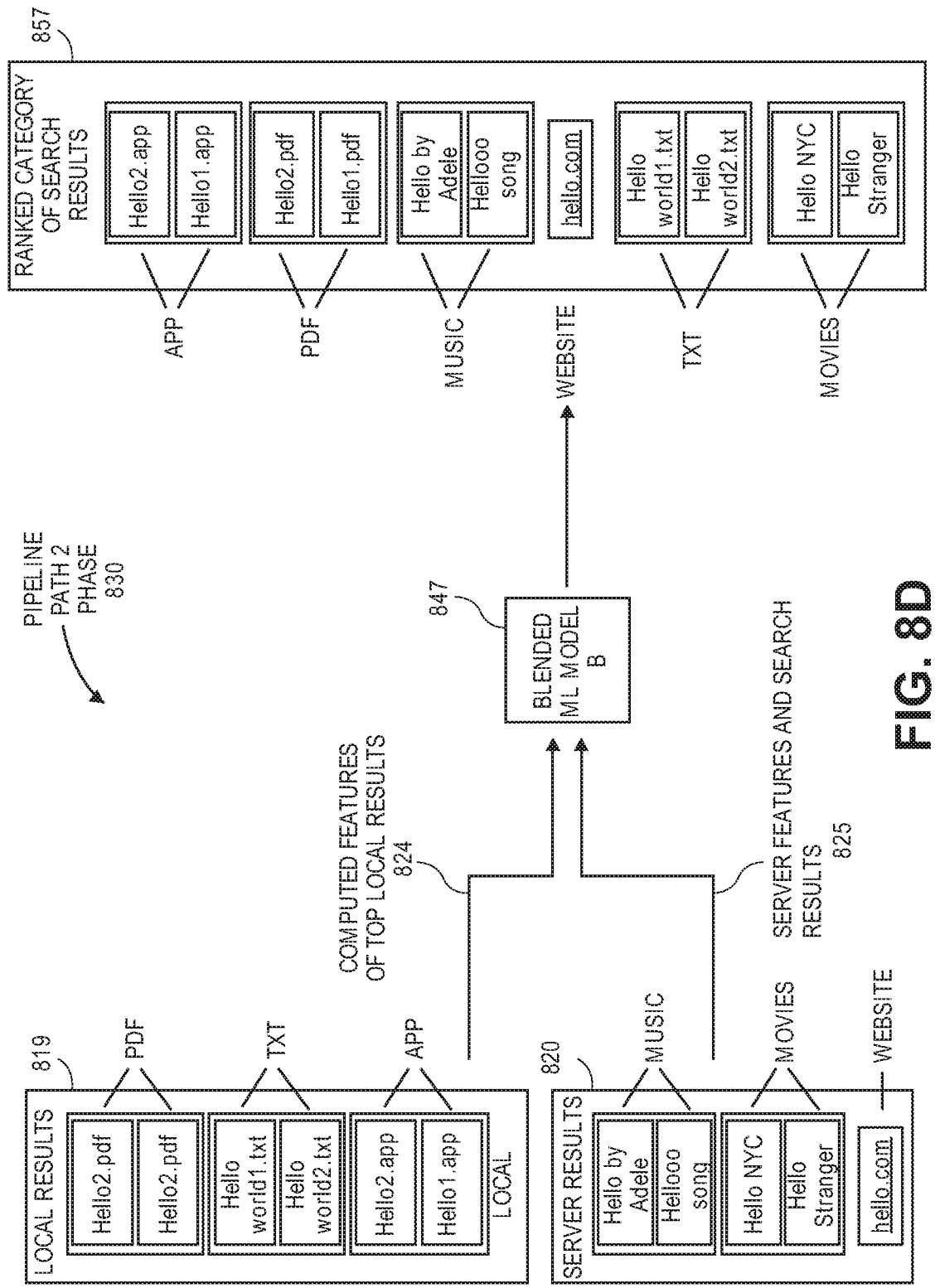

Referring to FIG. 8D, pipeline path 2 phase 830 is shown (e.g., operations 324 through 342). At blocks 819 and 820, the same local and remote search results are obtained as shown in FIG. 8C. At block 847, in one example, a blended ML model B receives or is fed computed features of top local results 824 and server features and search results 825. Blended ML model B can generate a score for each category from local results 819 and server results 820 and the categories can be ranked and displayed accordingly in ranked category of search results 857. As shown, e.g., the ranking of categories from highest to lowest is App, PDF, Music, Website, Txt, and Movies with ranked items accordingly in each category. Blended ML model B can generate different scores providing different ranked categories in ranked category of search results 837 than blended ML model A of FIG. 8C.

In the foregoing specification, specific examples and exemplary embodiments have been disclosed and described. It will be evident that various modifications may be made to those examples and embodiments without departing from the broader spirit and scope set forth in the following claims. The specification and drawings are, accordingly, to be regarded in an illustrative sense rather than a restrictive sense.

What is claimed is:

1. A computer-implemented method comprising:
receiving a search query from a user on a client device;
obtaining local search results and remote server search results;
filtering local search results based on the received search query and one or more local ranking rules;
computing features for each filtered local search result;
inputting the computed features of each filtered local search result to one or more machine learning (ML) models, each ML model generating a score for each filtered local search result;
ranking the filtered local search results based on the generated score within a category;
ranking a plurality of categories for the filtered local search results based on at least one generated score of the filtered local search results within each category from the plurality;
ranking the obtained local search results and remote server search results using at least one machine learning (ML) ranking model;
computing additional features for remote server search results;
inputting the additional computed features for the remote server search results and the computed features of top ranked local search results to a third machine learning (ML) ranking model;
generating a score for each of the local search results and remote server search results by the third ML ranking model;
computing a subset of features for top ranked local search results;
obtaining features of remote server search results;

inputting computed subset of features for top ranked local search results and features of remote server search results to a fourth machine learning (ML) ranking model;

generating a score for each of the local search results and remote server search results by the fourth ML ranking model;

combining the scores of the third and fourth ML ranking models;

ranking the local search results and remote server search based on the combined scores; and displaying the ranked local search results and remote server search results by category.

2. The method of claim 1, wherein filtering the local search results comprises:

applying the one or more ranking rules to each local search result to generate a bit vector including individual bits representing applicable ranking rules and one or more fixed combination of bits representing one or more count values;

comparing the one or more count values of each bit vector to rank the local search results based on the comparison; and identifying a set of top ranked local search results as the filtered local search results.

3. The method of claim 2, wherein the one or more count values in each bit vector of at least indicates a number of ranking rules applicable to each local search result.

4. The method of claim 3, wherein identifying the set of top ranked local search results as the filtered local search results includes ranking higher local search results with bit vectors having count values with higher numbers than local search results with bit vectors having count values with lower numbers.

5. The method of claim 4, wherein identifying the set of top ranked local search results includes selecting a subset of higher ranked local search results.

6. The method of claim 1, wherein computing features for the filtered local search results includes computing ranking values or Boolean values for the computed features to anonymize user data.

7. The method of claim 6, further comprising:

transforming the computed features of the filtered local search results for processing by the one or more ML models; and inputting the transformed computed features of the filtered local search results to the one or more machine learning (ML) models, each ML model generating a score for each filtered local search result.

8. The method of claim 7, wherein transforming the computed features uses feature dependent transformation operations.

9. The method of claim 8, wherein inputting the transformed computed features of the filtered local search results including inputting a first set of transformed computed features to a first ML model and a second set of computed features to a second ML model, the first ML model generating a first score and the second ML model generating a second score, and combining the first score with the second score to rank the filtered local search results.

10. The method of claim 9, wherein the first set and second set include different computed features.

11. The method of claim 1, further comprising:

selecting a first processing path or a second processing path to rank the obtained local search results and remote server search results.

12. The method of claim 11, wherein if the first processing path is selected, the method further comprises:

computing additional features for the remote server search results;

inputting the additional computed features for the remote server search results and computed features of top ranked local search results to a first machine learning (ML) ranking model;

generating a score for each of the local search results and remote server search results by the first ML ranking model; and displaying the ranked local search results and remote server search results by category.

13. The method of claim 11, wherein if the second processing path is selected, the method further comprises:

computing a subset of features for top ranked local search results;

obtaining features of remote server search results;

inputting computed subset of features for top ranked local search results and features of remote server search results to a second machine learning (ML) ranking model;

generating a score for each of the local search results and remote server search results by the second ML ranking model;

ranking the local search results and remote server search based on the generated score; and displaying the ranked local search results and remote server search results by category.

14. A computing device comprising:

a memory programmed with executable instructions; and a processing system coupled to the memory to execute the executable instructions and to receive a search query from a user on a client device;

obtain local search results and remote server search results;

filter local search results based on the received search query and one or more local ranking rules;

compute features for each filtered local search result;

input the computed features of each filtered local search result to one or more machine learning (ML) models, each ML model generating a score for each filtered local search result;

rank the filtered local search results based on the generated score within a category;

rank a plurality of categories for the filtered local search results based on at least one generated score of the filtered local search results within each category from the plurality;

rank the obtained local search results and remote server search results using at least one machine learning (ML) ranking model;

compute additional features for remote server search results;

input the additional computed features for the remote server search results and computed features of top ranked local search results to a third machine learning (ML) ranking model;

generate a score for each of the local search results and remote server search results by the third ML ranking model;

compute a subset of features for top ranked local search results;

obtain features of remote server search results;

input computed subset of features for top ranked local search results and features of remote server search results to a fourth machine learning (ML) ranking model;

generate a score for each of the local search results and remote server search results by the fourth ML ranking model;

combine the scores of the third and fourth ML ranking models; and rank the local search results and remote server search based on the combined scores; and display the ranked local search results and remote server search results by category.

15. The computing device of claim 14, wherein the processing system is to apply the one or more ranking rules to each local search result to generate a bit vector including individual bits representing applicable ranking rules and one or more fixed combination of bits representing one or more count values;

compare the one or more count values of each bit vector to rank the local search results based on the comparison; and identify a set of top ranked local search results as the filtered local search results.

16. The computing device of claim 15, wherein the one or more count values in each bit vector at least indicates a number of ranking rules applicable to each local search result.

17. The computing device of claim 15, wherein the processing system is to rank higher local search results with bit vectors having count values with higher numbers than local search results with bit vectors having count values with lower numbers.

18. The computing device of claim 17, wherein the processing system is to identify the set of top ranked local search results includes selecting a subset of higher ranked local search results.

19. The computing device of claim 14, wherein the processing system is to compute ranking values or Boolean values for the computed features to anonymize user data.

20. The computing device of claim 14, wherein the processing system is to transform the computed features of the filtered local search results for processing by the one or more ML models, and input the transformed computed features of the filtered local search results to the one or more machine learning (ML) models, each ML model generating a score for each filtered local search result of each category.

21. The computing device of claim 14, wherein the processing system is to use feature dependent transformation operations to transform the computed features.

22. The computing device of claim 14, wherein the processing system is to input a first set of transformed computed features to a first ML model and second set of computed features to a second ML model, the first ML model generating a first score and the second ML model generating a second score, and combine the first score and the second score to rank the filtered local search results, and wherein the first set and second set include different computed features.

23. A non-transitory machine-readable medium programmed with instructions that, when executed by a computing device, cause the computing device to perform operations comprising:

receiving a search query from a user on a client device;

obtaining local search results and remote server search results;

filtering local search results based on the received search query and one or more local ranking rules;

computing features for each filtered local search result;

inputting the computed features of each filtered local search result to one or more machine learning (ML) models, each ML model generating a score for each filtered local search result;

ranking the filtered local search results based on the generated score within a category;

ranking a plurality of categories for the filtered local search results based on at least one generated score of the filtered local search results within each category from the plurality;

ranking the obtained local search results and remote server search results using at least one machine learning (ML) ranking model;

computing additional features for remote server search results;

inputting the additional computed features for the remote server search results and computed features of top ranked local search results to a third machine learning (ML) ranking model;

generating a score for each of the local search results and remote server search results by the third ML ranking model;

computing a subset of features for top ranked local search results;

obtaining features of remote server search results;

inputting computed subset of features for top ranked local search results and features of remote server search results to a fourth machine learning (ML) ranking model;

generating a score for each of the local search results and remote server search results by the fourth ML ranking model;

combining the scores of the third and fourth ML ranking models;

ranking the local search results and remote server search based on the combined scores; and displaying the ranked local search results and remote server search results by category.

24. The non-transitory machine-readable medium of claim 23, to cause the computing device to perform operations comprising:

applying the one or more ranking rules to each local search result to generate a bit vector including individual bits representing applicable ranking rules and one or more fixed combination of bits representing one or more count values;

comparing the one or more count values of each bit vector to rank the local search results based on the comparison; and identifying a set of top ranked local search results as the filtered local search results.

25. The non-transitory machine-readable medium of claim 24, to cause the computing device to perform operations comprising:

ranking higher local search results with bit vectors having count values with higher numbers than local search results with bit vectors having count values with lower numbers; and selecting a subset of higher ranked local search results.

26. The non-transitory machine-readable medium of claim 24, to cause the computing device to perform operations comprising:

transforming the computed features of the filtered local search results for processing by the one or more ML models; and inputting the transformed computed features of the filtered local search results to the one or more machine learning (ML) models, each ML model generating a score for each filtered local search result.

27. The non-transitory machine-readable medium of claim 26, to cause the computing device to perform operations comprising:

inputting a first set of transformed computed features to a first ML model and a second set of computed features to a second ML model, the first ML model generating a first score and the second ML model generating a second score; and combining the first score with the second score to rank the filtered local search results.

28. The non-transitory machine-readable medium of claim 23, to cause the computing device to perform operations comprising:

computing ranking values or Boolean values for the computed features related to the filtered local search results to anonymize user data.

* * * * *